United States Patent
Mu et al.

(10) Patent No.: US 10,693,970 B2
(45) Date of Patent: *Jun. 23, 2020

(54) SERVICING OF STORAGE DEVICE SOFTWARE COMPONENTS OF NODES OF A CLUSTER STORAGE SYSTEM

(71) Applicant: NetApp Inc., Sunnyvale, CA (US)

(72) Inventors: Paul Yuedong Mu, Sunnyvale, CA (US); Nam Le, Sunnyvale, CA (US); John Hoffmann, Sunnyvale, CA (US); John Boyles, Sunnyvale, CA (US)

(73) Assignee: NetApp Inc., Sunyvale, CA (US)

( * ) Notice: Subject to any disclaimer, the term of this patent is extended or adjusted under 35 U.S.C. 154(b) by 184 days.

This patent is subject to a terminal disclaimer.

(21) Appl. No.: 15/879,727

(22) Filed: Jan. 25, 2018

(65) Prior Publication Data

US 2018/0167466 A1  Jun. 14, 2018

Related U.S. Application Data

(63) Continuation of application No. 14/970,178, filed on Dec. 15, 2015, now abandoned, which is a
(Continued)

(51) Int. Cl.
- *G06F 15/16* (2006.01)
- *H04L 29/08* (2006.01)
- *H04L 29/06* (2006.01)

(52) U.S. Cl.
CPC ............ *H04L 67/146* (2013.01); *H04L 63/10* (2013.01); *H04L 67/10* (2013.01);
(Continued)

(58) Field of Classification Search
CPC .............................. H04L 67/146; H04L 63/10
See application file for complete search history.

(56) References Cited

U.S. PATENT DOCUMENTS

| 5,987,506 A | 11/1999 | Carter et al. |
| 6,209,002 B1 | 3/2001 | Gagne et al. |

(Continued)

OTHER PUBLICATIONS

Non-Final Office Action cited in U.S. Appl. No. 12/372,646 dated Nov. 10, 2010, 37 pgs.
(Continued)

*Primary Examiner* — Hua Fan
(74) *Attorney, Agent, or Firm* — Cooper Legal Group, LLC

(57) ABSTRACT

Described herein are method and apparatus for servicing software components of nodes of a cluster storage system. During data-access sessions with clients, client IDs and file handles for accessing files are produced and stored to clients and stored (as session data) to each node. A serviced node is taken offline, whereby network connections to clients are disconnected. Each disconnected client is configured to retain its client ID and file handles and attempt reconnections. Session data of the serviced node is made available to a partner node (by transferring session data to the partner node). After clients have reconnected to the partner node, the clients may use the retained client IDs and file handles to continue a data-access session with the partner node since the partner node has access to the session data of the serviced node and thus will recognize and accept the retained client ID and file handles.

20 Claims, 18 Drawing Sheets

Related U.S. Application Data continuation of application No. 12/372,646, filed on Feb. 17, 2009, now Pat. No. 9,215,279.

(52) U.S. Cl.
CPC ........ *H04L 67/1097* (2013.01); *H04L 67/143* (2013.01); *H04L 63/08* (2013.01)

(56) References Cited

U.S. PATENT DOCUMENTS

| | | | |
|---|---|---|---|
| 6,351,776 B1 | 2/2002 | O'Brien et al. | |
| 6,539,494 B1 | 3/2003 | Abramson et al. | |
| 6,684,248 B1 | 1/2004 | Janacek et al. | |
| 6,944,133 B2 | 9/2005 | Wisner et al. | |
| 6,973,493 B1 | 12/2005 | Slaughter et al. | |
| 7,076,555 B1 | 7/2006 | Orman et al. | |
| 7,373,415 B1 | 5/2008 | Deshan et al. | |
| 7,617,370 B2 | 11/2009 | Jernigan et al. | |
| 7,734,777 B2 | 6/2010 | Raja et al. | |
| 7,814,210 B1 | 10/2010 | Mueller et al. | |
| 7,971,089 B2 | 6/2011 | Yoshikawa et al. | |
| 8,583,616 B2 | 11/2013 | Chatley et al. | |
| 9,215,279 B1 | 12/2015 | Le et al. | |
| 9,325,790 B1 | 4/2016 | Le et al. | |
| 2002/0078174 A1* | 6/2002 | Sim | H04L 47/125 709/219 |
| 2002/0116474 A1 | 8/2002 | Copeland et al. | |
| 2003/0061299 A1 | 3/2003 | Brown et al. | |
| 2003/0120751 A1 | 6/2003 | Husain et al. | |
| 2004/0010612 A1 | 1/2004 | Pandya | |
| 2004/0049573 A1 | 3/2004 | Olmstead et al. | |
| 2004/0249961 A1 | 12/2004 | Katsube et al. | |
| 2005/0160315 A1 | 7/2005 | Chandrasekaran et al. | |
| 2005/0193245 A1 | 9/2005 | Hayden et al. | |
| 2005/0271049 A1* | 12/2005 | Jain | H04L 29/06 370/389 |
| 2005/0278383 A1 | 12/2005 | Kazar et al. | |
| 2006/0206589 A1 | 9/2006 | Lentini et al. | |
| 2006/0271697 A1 | 11/2006 | Kruse et al. | |
| 2007/0078782 A1 | 4/2007 | Ono et al. | |
| 2007/0100964 A1 | 5/2007 | Davies et al. | |
| 2007/0174410 A1 | 7/2007 | Croft et al. | |
| 2007/0234116 A1* | 10/2007 | Yoshikawa | G06F 11/2007 714/13 |
| 2008/0086564 A1 | 4/2008 | Putman et al. | |
| 2008/0114858 A1 | 5/2008 | Singh et al. | |
| 2008/0133693 A1 | 6/2008 | Douglass et al. | |
| 2008/0215767 A1 | 9/2008 | Nagami et al. | |
| 2009/0187654 A1 | 7/2009 | Raja et al. | |
| 2009/0300710 A1* | 12/2009 | Chai | G06F 21/6218 726/1 |
| 2009/0307351 A1 | 12/2009 | Raja et al. | |
| 2009/0327502 A1 | 12/2009 | Brewer et al. | |
| 2010/0138534 A1 | 6/2010 | Mutnuru et al. | |
| 2010/0242105 A1 | 9/2010 | Harris et al. | |
| 2010/0242106 A1 | 9/2010 | Harris et al. | |

OTHER PUBLICATIONS

Reply Non-Final Office Action cited in U.S. Appl. No. 12/372,646 dated Jan. 17, 2011, 54 pgs.
Final Office Action cited in U.S. Appl. No. 12/372,646 dated Mar. 29, 2011, 50 pgs.
Reply Final Office Action cited in U.S. Appl. No. 12/372,646 dated May 31, 2011, 27 pgs.
Non-Final Office Action cited in U.S. Appl. No. 12/372,646 dated Mar. 28, 2013, 36 pgs.
Reply Non-Final Office Action cited in U.S. Appl. No. 12/372,646 dated Jun. 5, 2013, 13 pgs.
Final Office Action cited in U.S. Appl. No. 12/372,646 dated Jan. 17, 2014, 29 pgs.
Reply Final Office Action cited in U.S. Appl. No. 12/372,646 dated Apr. 17, 2014, 11 pgs.
Notice of Allowance cited in U.S. Appl. No. 12/372,646 dated Aug. 14, 2015, 15 pgs.
Preliminary Amendment cited in U.S. Appl. No. 14/970,178 dated Jan. 11, 2016, 7 pgs.
Non-Final Office Action cited in U.S. Appl. No. 14/970,178 dated Jul. 12, 2017, 23 pgs.
Reply Non-Final Office Action cited in U.S. Appl. No. 14/970,178 dated Oct. 12, 2017, 11 pgs.
Notice of Non-Compliant Office Action cited in U.S. Appl. No. 14/970,178 dated Dec. 8, 2017, 3 pgs.
Non-Final Office Action cited in U.S. Appl. No. 12/372,637 dated Apr. 2, 2013, 41 pgs.

\* cited by examiner

SERVICING OF STORAGE DEVICE SOFTWARE COMPONENTS OF NODES OF A CLUSTER STORAGE SYSTEM

CROSS REFERENCE TO RELATED APPLICATION

This application claims priority to and is a continuation of U.S. application Ser. No. 14/970,178 filed on Dec. 15, 2015, titled "SERVICING OF STORAGE DEVICE SOFTWARE COMPONENTS OF NODES OF A CLUSTER STORAGE SYSTEM," which is a continuation of U.S. Pat. No. 9,215,279 filed on Feb. 17, 2009, titled "SERVICING OF STORAGE DEVICE SOFTWARE COMPONENTS OF NODES OF A CLUSTER STORAGE SYSTEM," which are incorporated herein by reference.

FIELD OF THE INVENTION

The present invention relates to storage systems, and particularly, to servicing of storage device software components of nodes of a cluster storage system.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units (LUs). For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from NetApp, Inc. Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing access requests (read/write requests) as file-based and block-based protocol messages (in the form of packets) to the system over the network.

A plurality of storage systems may be interconnected to provide a storage system architecture configured to service many clients. In some embodiments, the storage system architecture provides one or more aggregates and one or more volumes distributed across a plurality of nodes interconnected as a cluster. The aggregates may be configured to contain one or more volumes. The volumes may be configured to store content of data containers, such as files and logical units, served by the cluster in response to multi-protocol data access requests issued by clients. Each node of the cluster includes (i) a storage server (referred to as a "disk element") adapted to service a particular aggregate or volume and (ii) a multi-protocol engine (referred to as an "network element") adapted to redirect the data access requests to any storage server of the cluster.

In the illustrative embodiment, the storage server of each node is embodied as a disk element and the multi-protocol engine is embodied as a network element. The network element receives a multi-protocol data access request from a client, converts that access request into a cluster fabric (CF) message and redirects the message to an appropriate disk element of the cluster. In some embodiments, the disk element and network element of a node comprise software components that are serviced (e.g., upgraded, re-installed, perform maintenance, repaired, etc.) from time to time.

Typically, clients will connect with a node for data-access sessions with the node. During a data-access session with a node, a client may obtain a client identifier (ID) for connecting with the network element and one or more file handles to access files through the disk element. The client ID needs to be produced through a connection authentication procedure and each file handle needs to be produced through an access request validation procedure. The client then uses the client ID and file handles in subsequent access requests sent to the node. The node also stores session data comprising the client ID and file handles of each connected client, so it may recognize the client IDs and file handles sent in the access requests. If the node does not recognize the client ID and file handle in an access request, the node may deny processing of the access request.

Typically, servicing of the disk element and network element of a node requires the serviced node to be taken offline, thereby disconnecting any client data-access sessions with the serviced node. Conventionally, upon disconnect with the serviced node, the client will drop/delete the client ID and all file handles and the serviced node will close all open files accessed by the file handles. Upon reconnection with a failover partner node of the serviced node, the client ID needs to be reproduced through the connection authentication procedure and each file handle needs to be reproduced through an access request validation procedure. Thus, servicing of the disk element and network element of each node typically causes substantial disruption to client data-access sessions. As such, there is a need for a less disruptive way of servicing software components of nodes of a cluster.

SUMMARY OF THE INVENTION

In some embodiments, a servicing module residing on each node of the cluster provides less disruptive servicing of the software components of the nodes of a cluster. In these embodiments, each client is configured to retain its client ID and any file handles upon disconnection with a serviced node. Each client is also configured to automatically attempt to reconnect with a partner node and attempt to re-establish the data-access session with the partner node using the retained client ID and file handles. While the clients attempt to reconnect with the partner node, session data (comprising the client IDs and file handles) stored in the serviced node made available to the partner node (e.g., is transferred to the partner node). After the clients have reconnected to the partner node, the clients may use the retained client ID and file handles to continue the data-access session with the partner node. This is possible since the partner node now has access to the session data of the serviced node and thus will recognize and accept the retained client ID and file handles. The partner node may "recognize" the received client IDs and file handles by comparing and matching the received client IDs to the stored client IDs and file handles in the session data of the serviced node.

In the embodiments described herein, there is less disruption to clients accessing the cluster for data-access sessions during servicing of software components of the nodes of a cluster. In particular, when a serviced node is taken offline and clients are disconnected from the serviced node, the disconnected clients can continue the data-access sessions with the partner node using the previously obtained client IDs and file handles. As such, the client ID does not need to be reproduced through the connection authentication procedure and each file handle does not need to be reproduced through an access request validation procedure.

In some embodiments, the disk element and network element of a node comprise software components that are serviced (e.g., upgraded, re-installed, perform maintenance, repaired, etc.). In some embodiments, the network element of a node comprises a network software component configured for interacting/interfacing with clients through a network connection (e.g., for receiving access requests from the clients and routing the access requests to the appropriate disk element). In some embodiments, the disk element of a node comprises a storage device software component configured for interacting/interfacing with a set of storage devices comprising a shared storage of the cluster (e.g., for receiving access requests from the network element and performing the access requests on the shared storage).

The shared storage of the cluster may be accessible by each node of the cluster. However, particular storage sub-portions of the shared storage may be accessible only to an assigned/associated node in normal operating conditions. For example, a system aggregate and a data aggregate in the shared storage is typically assigned/associated for each node for the node to access exclusively. In a failover event (such as a particular node being offline), the data aggregate assigned to the particular node may be made accessible to the partner node as well. The system aggregate, however, is typically accessible only to the particular node and not to the partner mode, even during a failover event.

In some embodiments, only the disk element software component of one or more nodes of a cluster is serviced. Servicing of the disk elements of the cluster begins with a serviced node A having partner node B, and is repeated for each node of the cluster. Prior to servicing, the serviced disk element of node A has stored session data A (e.g., comprising "original" client IDs file handles and permission and lock state data) to the system aggregate A and the partner disk element of node B has stored session data B to the system aggregate B. Also, the serviced disk element services data from data aggregate A and the partner disk element services data from data aggregate B in the shared storage.

Prior to servicing, session data A may contain one or more file handles produced by the serviced node for one or more files (stored on the shared storage) that were accessed using the serviced disk element. Each file handle for a file may be produced by the serviced node for a client submitting an initial access request for the file. The file handle may be produced during an access request validation procedure (performed by the serviced disk element) that validates the initial access request (e.g., by determining permission and lock type associated with the client submitting the initial access request).

After servicing is initiated, the serviced disk element of node A is taken offline. For each client having an open file handle for a file stored on data aggregate A, the network connection between the client and an network element is disconnected by closing the respective network port on the network element. As such, each client currently accessing a file using the serviced disk element is disconnected. Each disconnected client is configured to begin to attempt reconnections with the network element while also retaining any original client ID and file handles received prior to the network disconnection. Servicing of the serviced disk element software component then begins.

Session data A stored in system aggregate A is transferred to system aggregate B for storage. The partner disk element will now have access to session data A (stored in system aggregate B) for files stored on data aggregate A. The partner disk element will also be configured to access data aggregate A upon failure of the serviced disk element. The network ports are then re-opened and the disconnected clients will reconnect with their respective network elements. The partner disk element begins servicing data on data aggregate A using the session data A by receiving access requests (containing original client ID and original file handles) from the reconnected clients. The partner disk element may "recognize" the received client IDs and file handles by matching the received client IDs to the stored client IDs and file handles in session data A.

As such, the partner disk element may use the original client ID and original file handles to validate access requests to previously opened files (by using the permission and lock state data). Thus the partner disk element accesses the previously opened files using the original client ID and original file handles, without having to perform an access request validation procedure for the previously opened files and without having to produce new file handles for the previously opened files.

This process may be repeated for each node in the cluster, whereby each node in the cluster is serviced one after the other. By performing servicing on one node in the cluster at a time, the entire cluster system does not need to be taken offline, thus reducing disruption to client data-access.

DETAILED DESCRIPTION

In the following description, numerous details are set forth for purpose of explanation. However, one of ordinary skill in the art will realize that the embodiments described herein may be practiced without the use of these specific details. In other instances, well-known structures and devices are shown in block diagram form in order not to obscure the description with unnecessary detail.

The description that follows is divided into seven sections. Section I describes a cluster environment in which some embodiments operate. Section II describes a storage operating system having a servicing module for servicing software components of nodes of the cluster. Section III describes a shared storage of the cluster. Section IV describes a client data-access session between a client and a node. Section V describes servicing of software components of nodes of the cluster. Section VI describes servicing of network software components (network elements) of nodes of the cluster. Section VII describes servicing of storage device software components (disk elements) of nodes of the cluster.

I. Cluster Environment

Figure 1:
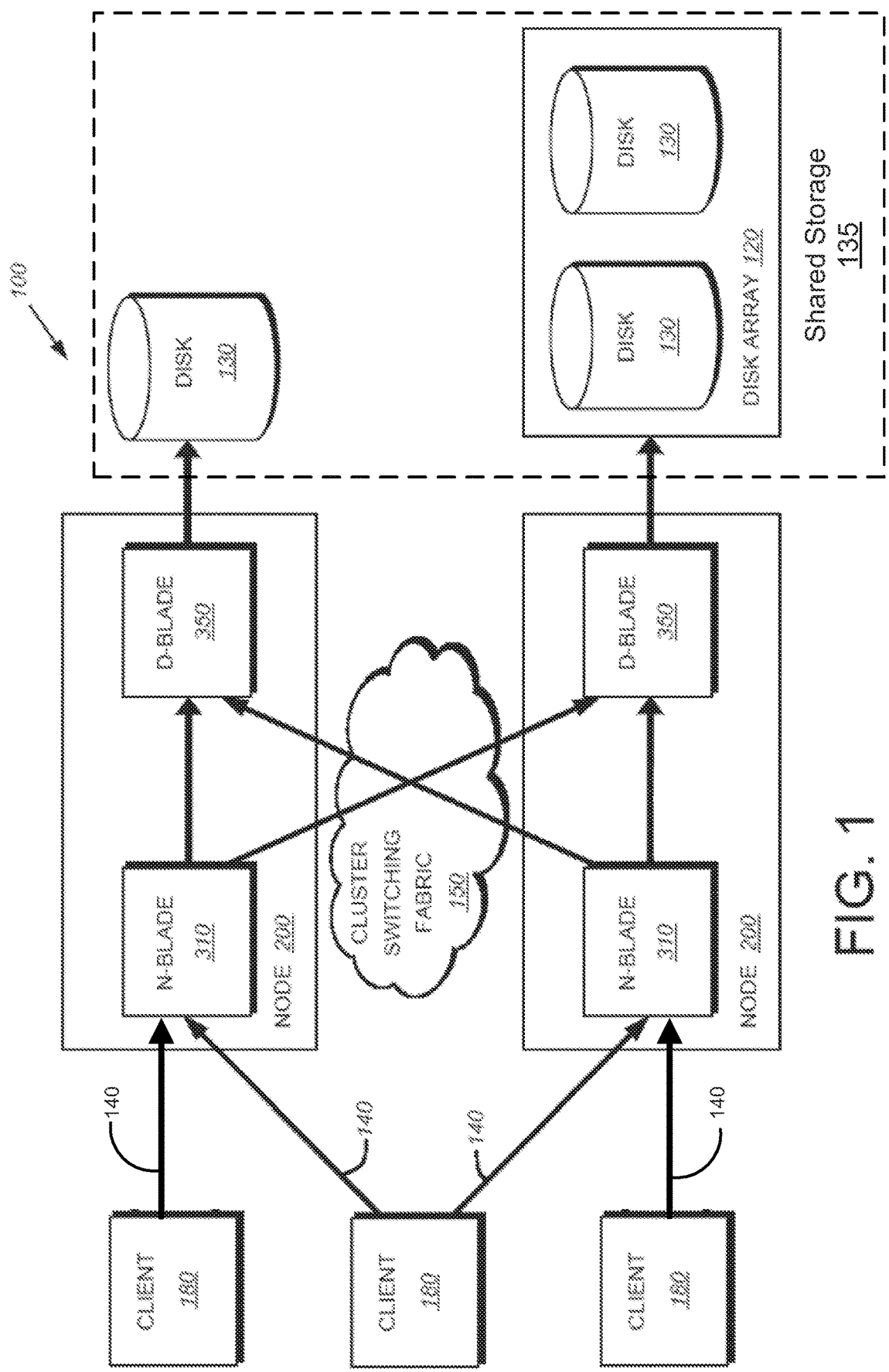
FIG. 1 is a schematic block diagram of an exemplary cluster environment in which some embodiments operate.

FIG. 1 is a schematic block diagram of an exemplary cluster 100 environment in which some embodiments operate. A cluster 100 may comprise a plurality of interconnected nodes 200 configured to provide storage services for a set of storage devices. The nodes 200 comprise various functional components that cooperate to provide a distributed storage system architecture of the cluster 100. Each node 200 may be organized as a network element (network element 310) and a disk element (disk element 350).

The network element 310 includes functionality that enables the node 200 to connect to clients 180 over a computer network 140, while each disk element 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary distributed file system architecture is generally described in U.S. Patent Application Publication No. US 2002/0116593 titled METHOD AND SYSTEM FOR RESPONDING TO FILE SYSTEM REQUESTS, by M. Kazar et al. published Aug. 22, 2002.

It should be noted that while there is shown an equal number of N and disk elements in the illustrative cluster 100, there may be differing numbers of N and/or disk elements in accordance with various embodiments. For example, there may be a plurality of network elements and/or disk elements interconnected in a cluster configuration 100 that does not reflect a one-to-one correspondence between the network and disk elements. As such, the description of a node 200 comprising one network element and one disk element should be taken as illustrative only. For example, a node 200 may also have one network element and a plurality of disk elements, a plurality of network elements and one disk element, or a plurality of network elements and a plurality of disk elements.

The clients 180 may be general-purpose computers configured to interact with the node 200 in accordance with a client/server model of information delivery. That is, each client 180 may request the services of the node 200 (e.g., by submitting read/write requests), and the node 200 may return the results of the services requested by the client 180, by exchanging packets over the network 140. The client 180 may submit access requests by issuing packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may submit access requests by issuing packets using block-based access protocols, such as the Small Computer Systems Interface (SCSI) protocol encapsulated over TCP (iSCSI) and SCSI encapsulated over Fibre Channel (FCP), when accessing information in the form of blocks.

In some embodiments, a client 180 connects to a node 200 for a data-access session, during which time the client 180 may receive one or more file handles from the node 200 for accessing one or more files (as discussed below). Upon a network connection failure with the node 200, the client 180 may be configured to retain any received file handles for a predetermined grace time period after the initial connection failure occurs. During this predetermined grace period, the client 180 may also be configured to automatically perform a predetermined number of reconnection attempts. If a reconnection is not successful after the predetermined number of reconnection attempts, the client 180 may be configured to drop/delete the previous file handle(s) obtained by the client 180. If within the predetermined number of reconnection attempts, a reconnection is successful, the client 180 may be configured to retain the previous file handles and re-use the file handles to access the same files, without needing to reproduce new file handles. This feature is sometimes referred to as the "durable file handle" feature. In some embodiments, a client 180 executes a current Windows® operating system that implements a current network file protocol, such as Server Message Block (SMB) 2.0 that provides this "durable file handle" feature.

In some embodiments, the totality of storage space provided by the disks 130 and disk arrays 120 of the cluster 100 comprise a total shared storage space (referred to as "shared storage 135") of the cluster 100. The shared storage 135 is accessible by each disk element 350 of each node 200 in the cluster 100. The shared storage 135 is discussed in detail in Section III. In some embodiments, the cluster 100 may provide high availability of service to clients 180 in accessing the shared storage 135. For example, the nodes 200 may be configured to communicate with one another (e.g., via cluster switching fabric 150) to act collectively to offset any single node 200 failure within the cluster 100. In these embodiments, each node 200 may have a predetermined failover "partner" node 200. When a node 200 failure occurs (where the failed node is no longer capable of processing access requests for clients 180), access requests sent to the failed node 200 may be re-directed to the partner node 200 for processing. Note that a node 200 failure may occur unintentionally or intentionally (e.g., where a node is taken offline for servicing).

Figure 2:
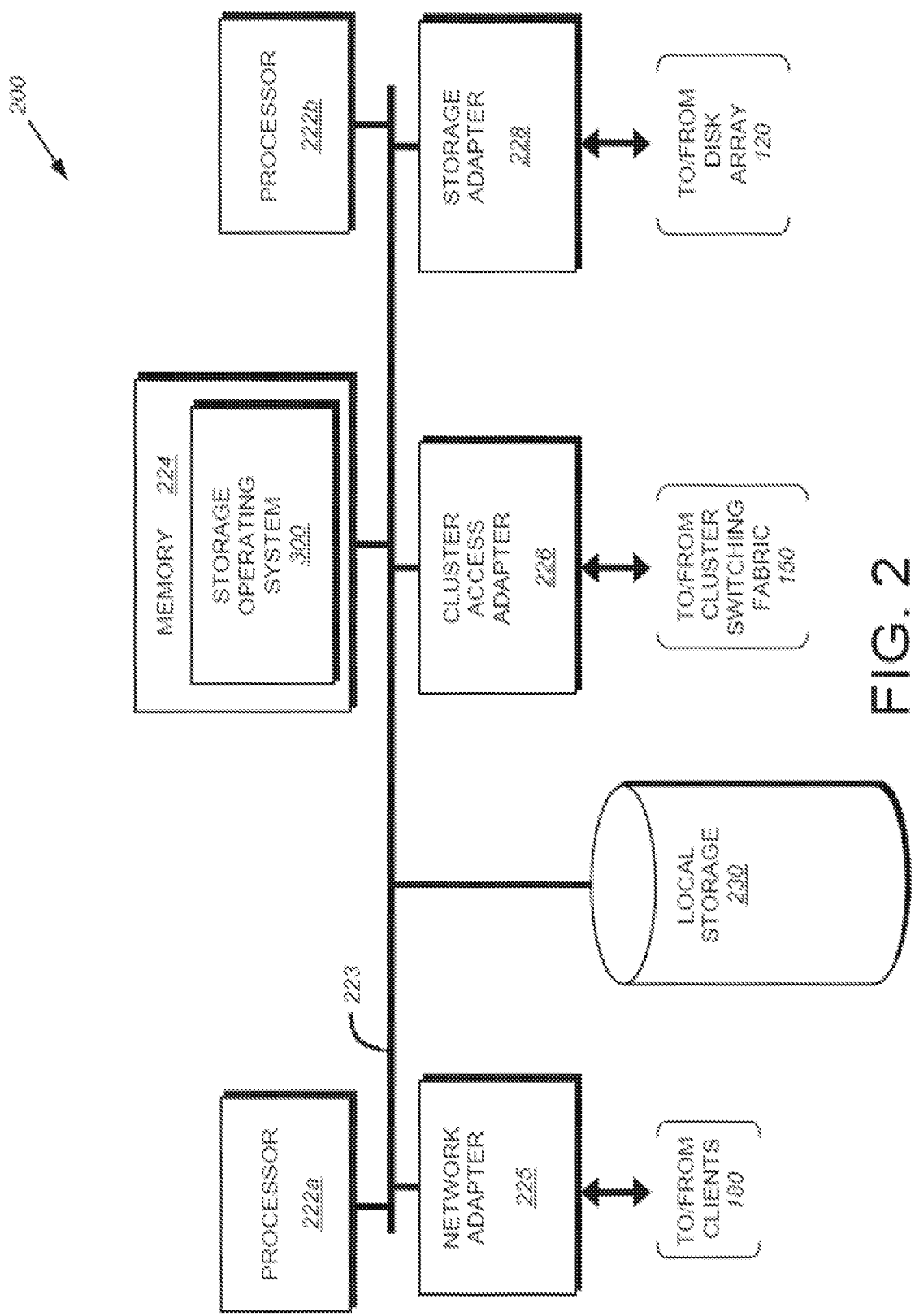
FIG. 2 is a schematic block diagram of an exemplary node that may be employed in the cluster environment of FIG. 1.

FIG. 2 is a schematic block diagram of an exemplary node 200 that may be employed in the cluster environment of FIG. 1. A node 200 may be illustratively embodied as a storage system comprising a plurality of processors 222a,b, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information, e.g., provided by one or more management processes.

The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the network elements and disk elements are implemented on separate storage systems or computers, the cluster access adapter 226 is utilized by the N/disk element for communicating with other N/disk elements in the cluster 100.

Each node 200 is illustratively embodied as a dual processor storage system executing a storage operating system 300 that preferably implements a high-level module, such as a file system, to logically organize the information as a hierarchical structure of named data containers, such as directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the network element 310 on the node, while the other processor 222b executes the functions of the disk element 350.

The memory 224 illustratively comprises storage locations that are addressable by the processors and adapters for storing software program code and data used in some embodiments. The processor and adapters may, in turn, comprise processing elements and/or logic circuitry configured to execute the software code and manipulate the data. The storage operating system 300, portions of which is typically resident in memory and executed by the processing elements, functionally organizes the node 200 by, inter alia, invoking storage operations in support of the storage services implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node 200 over the network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

II. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the Data ONTAP® software operating system available from NetApp, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 3:
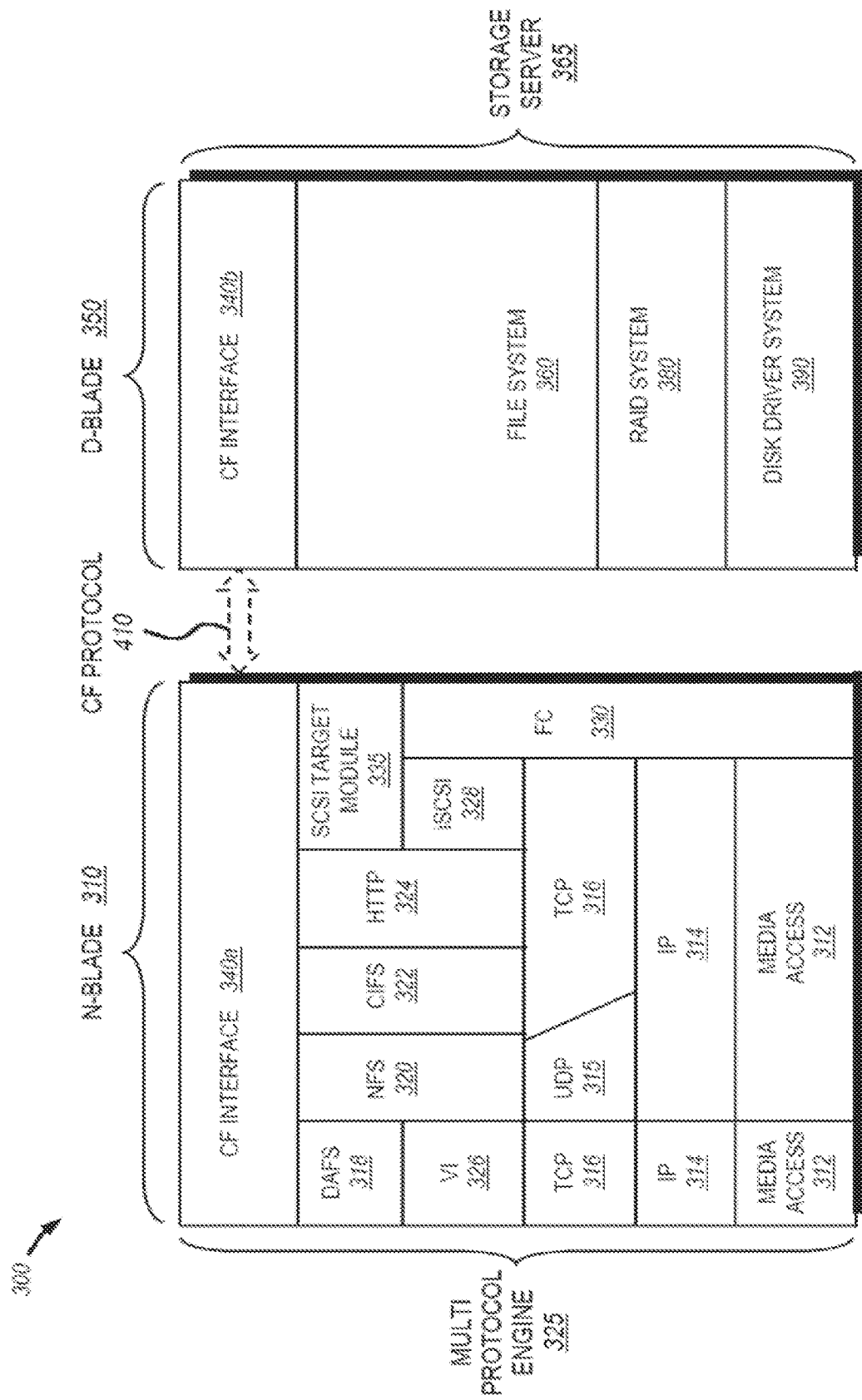
FIG. 3 is a schematic block diagram of an exemplary storage operating system 300 that may be implemented by the node in FIG. 2.

FIG. 3 is a schematic block diagram of an exemplary storage operating system 300 that may be implemented by the node 200 in FIG. 2. The storage operating system 300 comprises a series of software layers organized to form an integrated network protocol stack or, more generally, a multi-protocol engine 325 (network element 310) that provides data paths for clients 180 to access data stored on the node 200 using block and file access protocols. The multi-protocol engine 325 includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315.

A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system 300 includes a series of software layers organized to form a storage server 365 (disk element 350) that provides data paths for accessing information stored on the disks 130 of the node 200. To that end, the storage server 365 includes a file system module 360, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol.

The file system 360 implements a virtualization system of the storage operating system 300 through the interaction with one or more virtualization modules illustratively embodied as, e.g., a virtual disk (vdisk) module (not shown) and a SCSI target module 335. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that allocates storage space for itself in the disk array 120 and controls the layout of information on the array. The file system further provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file. A file (data container) handle, i.e., an identifier that includes an inode number, is used to retrieve an inode from disk.

All inodes of the write-anywhere file system may be organized into the inode file. A file system (fs) info block specifies the layout of information in the file system and includes an inode of a data container, e.g., file, that includes all other inodes of the file system. Each logical volume (file system) has an fsinfo block that may be stored at a fixed or variable location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, an access request (read/write request) from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system produces operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the access request, the node 200 (and storage operating system 300) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system 300 can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

In some embodiments, the storage server 365 is embodied as disk element 350 of the storage operating system 300 to service one or more volumes of array 120. In addition, the multi-protocol engine 325 is embodied as network element 310 to (i) perform protocol termination with respect to a client issuing incoming data access request packets over the network 140, as well as (ii) redirect those data access requests to any storage server 365 of the cluster 100. Moreover, the network element 310 and disk element 350 cooperate to provide a highly-scalable, distributed storage system architecture of the cluster 100. To that end, each blade includes a cluster fabric (CF) interface module 340a,b adapted to implement intra-cluster communication among the blades (e.g., communication between blades of the same node or communication between blades of different nodes) using CF protocol messages.

For example, the protocol layers (e.g., the NFS/CIFS layers and the iSCSI/FC layers) of the network element 310 may function as protocol servers that translate file-based and block-based access requests from clients 180 into CF protocol messages used for communication with the disk element 350. In some embodiments, the network element servers convert the incoming client access requests into file system primitive operations (commands) that are embedded within CF protocol messages by the CF interface module 340 for transmission to the disk elements 350 of the cluster 100. Notably, the CF interface modules 340 cooperate to provide a single file system image across all disk elements 350 in the cluster 100. Thus, any network port of an network element that receives a client request can access any data container within the single file system image located on any disk element 350 of the cluster.

In some embodiments, the network element 310 and disk element 350 are implemented as separately-scheduled processes of storage operating system 300. In other embodiments, the network element 310 and disk element 350 may be implemented as separate software components/code within a single operating system process. Communication between an network element and disk element in the same node 200 is thus illustratively effected through the use of CF messages passing between the blades. In the case of remote communication between an network element and disk element of different nodes, such CF message passing occurs over the cluster switching fabric 150.

A known message-passing mechanism provided by the storage operating system to transfer information between blades (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from NetApp, Inc. The SpinFS protocol is described in the above-referenced U.S. Patent Application Publication No. US 2002/0116593.

The CF interface module 340 implements the CF protocol for communicating file system commands/messages among the blades of cluster 100. Communication is illustratively effected by the disk element exposing the CF API to which an network element (or another disk element) issues calls. To that end, the CF interface module 340 is organized as a CF encoder and CF decoder. The CF encoder of, e.g., CF interface 340a on network element 310 encapsulates a CF message as (i) a local procedure call (LPC) when communicating a file system command to a disk element 350 residing on the same node 200 or (ii) a remote procedure call (RPC) when communicating the command to a disk element residing on a remote node of the cluster 100. In either case, the CF decoder of CF interface 340b on disk element 350 de-encapsulates the CF message and processes the file system command. As used herein, the term "CF message" may be used generally to refer to LPC and RPC communication between blades of the cluster.

Figure 4:
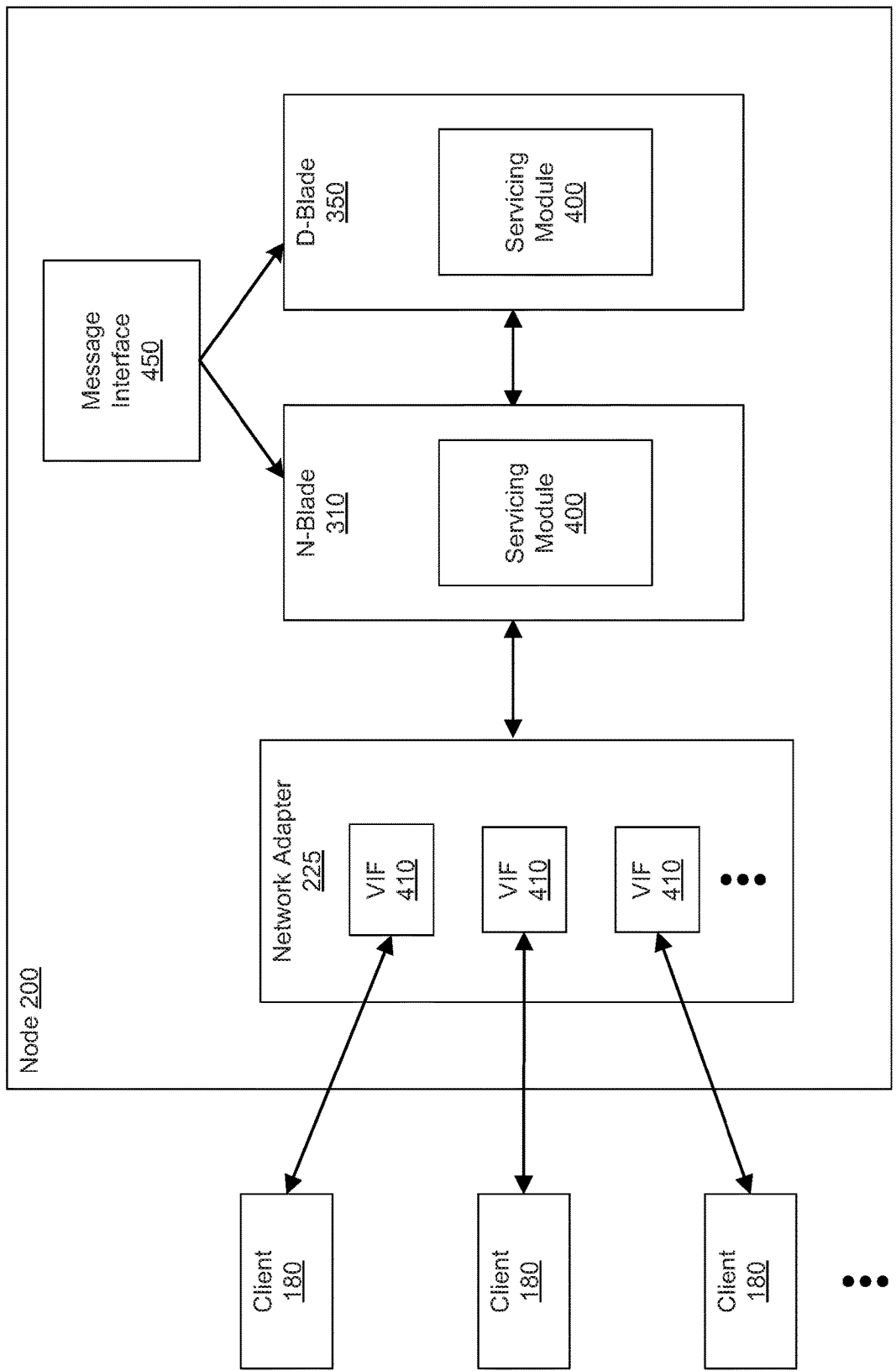
FIG. 4 shows a conceptual diagram of a node comprising network element and disk element, each blade comprising a servicing module.

In some embodiments, the storage operating system 300 also comprises a servicing module for performing servicing on the network element 310 and/or disk element 350 software components of one or more nodes 200 of a cluster. For example, the servicing module may perform upgrading (replacing software with newer versions), re-installing, maintenance, repairing, etc. of the network element 310 and/or disk element 350 software components. FIG. 4 shows a conceptual diagram of a node 200 comprising network element 310 and disk element 350, each blade comprising a servicing module 400. The servicing modules 400 in each blade may operate in conjunction to perform servicing of the network element 310 and/or disk element 350 software components. For example, the servicing modules 400 may issue CF messages or other commands to the network element 310 and disk element 350 to perform the methods described herein. After initiation, the servicing modules 400 may do so automatically (without human initiation or intervention) for one or more nodes 200 of a cluster 100 with reduced disruption to clients 180 connected to the nodes 200.

The servicing module 400 may be initiated to perform the servicing of software components by administrative command. The administrative command may be received by a message interface module 450 comprising, for example, a user interface or command interface. The message interface 450 may be used to receive administrative commands (e.g., in the form of CF messages) for managing and issuing commands to the node 200. The message interface 450 then routes the received command to the proper software module(s).

As discussed above, a node 200 may have a network adapter 225 comprising a plurality of network ports 410 (data-access ports). Each network port 410 may provide a network connection between the node 200 and a client 180 to provide data-access service to the client 180 over a network 140. In some embodiments, each network port 410 is implemented as a virtual component comprising a virtual interface (VIF). Each network port 410/VIF may have an associated unique identifier (e.g., an Internet Protocol (IP) address endpoint) within the cluster 100 that is received and used by the client 180 to establish the network connection. A VIF may transparently change association from one network port 410 to another network port 410 (within the same node 200 or across different nodes 200) while data-access service to a client 180 continues uninterrupted through the change. The VIF may retain the same identifier (e.g., an IP address endpoint) with the client 180 through the change of association so that changes of the underlying network ports 410 occur transparently to a client 180 connected with a VIF. As such, the network connection 410 with the client 180 is maintained transparently to the client 180 as changes of association of the underlying network ports 410 occur.

A VIF may provide a client interface to the network element 310 of a node. As such, in the following description and figures, a VIF is sometimes conceptually described and shown as part of the network element 310. In some embodiments, when an network element 310 of a node 200 is being serviced by the servicing module 400, any VIFs of the serviced network element 310 and serviced node 200 may change association from network ports 410 of the serviced network element 310 and serviced node 200 to network ports 410 of the partner network element 310 and partner node 200 during the servicing. In this way, data-access to any clients 180 formerly connected to the serviced network element 310 and serviced node 200 may continue through the partner network element 310 and partner node 200 during the servicing.

III. Shared Storage

Figure 5:
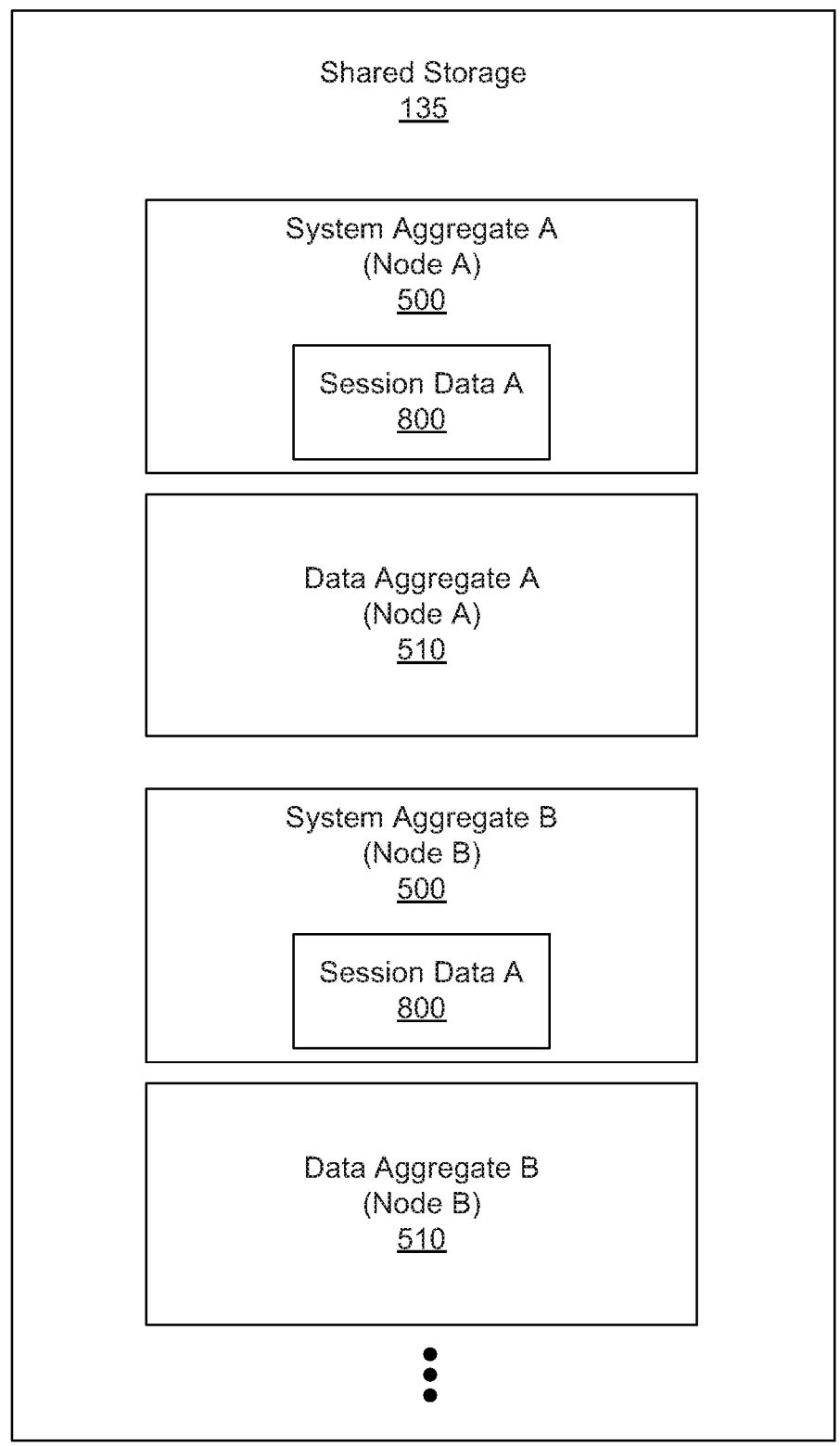
FIG. 5 shows a conceptual diagram of an exemplary shared storage comprising a plurality of aggregates.

As discussed above, in relation to FIG. 1, the totality of storage space provided by the disks 130 and disk arrays 120 of the cluster 100 comprise a total shared storage space (referred to as "shared storage 135") of the cluster 100. The shared storage 135 is accessible by each disk element 350 of each node 200 in the cluster 100. FIG. 5 shows a conceptual diagram of an exemplary shared storage 135 comprising a plurality of aggregates, each aggregate comprising a sub-portion of the total available storage space of the shared storage 135.

In these embodiments, each node 200 of the cluster 100 is assigned/associated with a system aggregate 500 and a data aggregate 510. For example, node A may be assigned/associated with "system aggregate A" and "data aggregate A" and node B may be assigned/associated with "system aggregate B" and "data aggregate B." Each system aggregate may be used for storing system information for the associated node 200. Such system information may include session data 800 comprising data collected from the network element 310 and disk element 350 during data-access sessions with clients 180. Each data aggregate may be used for storing client data for the associated node 200, whereby clients 180 may read and write to the data.

Each node 200 may be configured to access only the system and data aggregates assigned to the respective node 200. As such, the disk element 350 of each node 200 may be configured to access only the system and data aggregates assigned to the node 200. In the example of FIG. 5, the disk element 350 of node A may be configured to access and serve data from only system aggregate A or data aggregate A and the disk element 350 of node B may be configured to access and serve data from only system aggregate B or data aggregate B. Therefore, in normal operation (when node failures have not occurred), all access requests (received at any network element 310 of any node 200 in the cluster) for data in data aggregate A are routed through the disk element 350 of node A (and have physical addresses/file handles that specify the disk element 350 of node A).

In the event of a node failure, the failed node is no longer capable of processing access requests (read/write requests) from clients 180 for data in the data aggregate assigned to the failed node. In such an event, the access requests sent to the failed node 200 may be re-directed to the predetermined partner node 200 for processing. The predetermined partner node 200 of the failed node may be configured to replace the failed node by accessing and serving data in the data aggregate assigned to the failed node (as well as the accessing and serving data in its own assigned data aggregate).

As used herein, node A is the "primary" node and the disk element 350 of node A is the "primary" disk element 350 that "own" and "service" data containers stored in data aggregate A. As used herein, node B is the "primary" node and the disk element 350 of node B is the "primary" disk element 350 that "own" and "service" data containers stored in data aggregate B. As used herein, node B is the partner node of node A, whereby node B and the disk element 350 of node B "own" and "service" data containers stored in data aggregates A and B upon failure of node A. Under normal operating conditions (where node A has not failed), node B and the disk element 350 of node B do not service data containers stored in data aggregate A. Note, however, that the network element 310 of each node can receive access requests for data in any data aggregate 510 of the shared storage 135, and will route the access requests to the appropriate disk element 350 that services the requested data.

Figure 6:
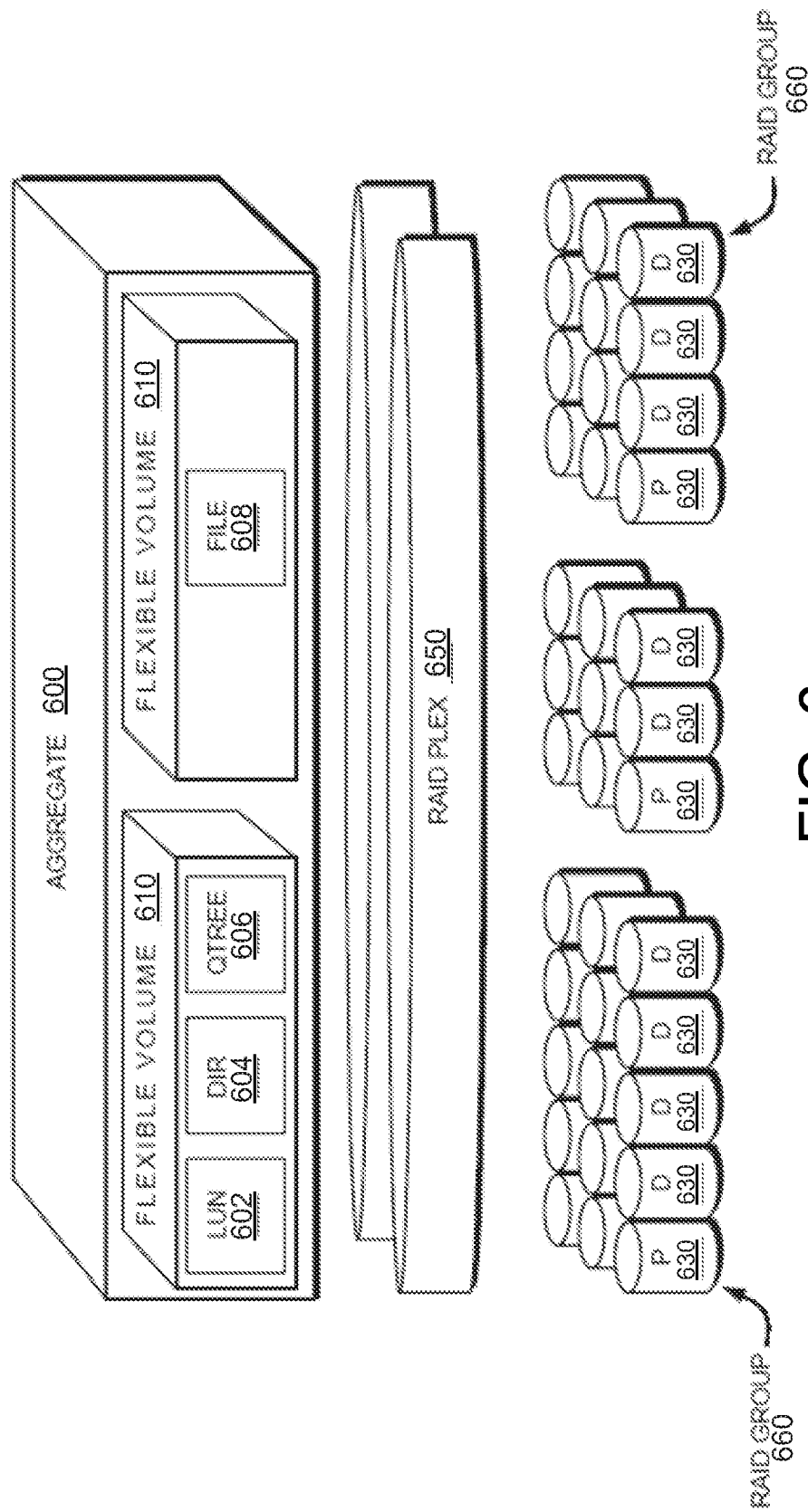
FIG. 6 is a schematic block diagram of an embodiment of an aggregate.

FIG. 6 is a schematic block diagram of an embodiment of an aggregate 600 (system or data aggregate) that may be used in some embodiments. The total storage space of an aggregate 600 may be allocated among a set of one or more flexible volumes 610. A flexible volume 610 may be dynamically increased or decreased in storage size within the total storage space of the aggregate 600. Each flexible volume 610 may comprise one or more data containers, such as, Luns (blocks) 602, directories 604, qtrees 606, files 608, etc. The aggregate 600 is illustratively layered on top of the RAID system, which is represented by at least one RAID plex 650 (depending upon whether the storage configuration is mirrored), wherein each plex 650 comprises at least one RAID group 660. Each RAID group further comprises a plurality of disks 630, e.g., one or more data (D) disks and at least one (P) parity disk.

IV. Client Data-Access Session

A. Client Data-Access Sessions

Figure 7:
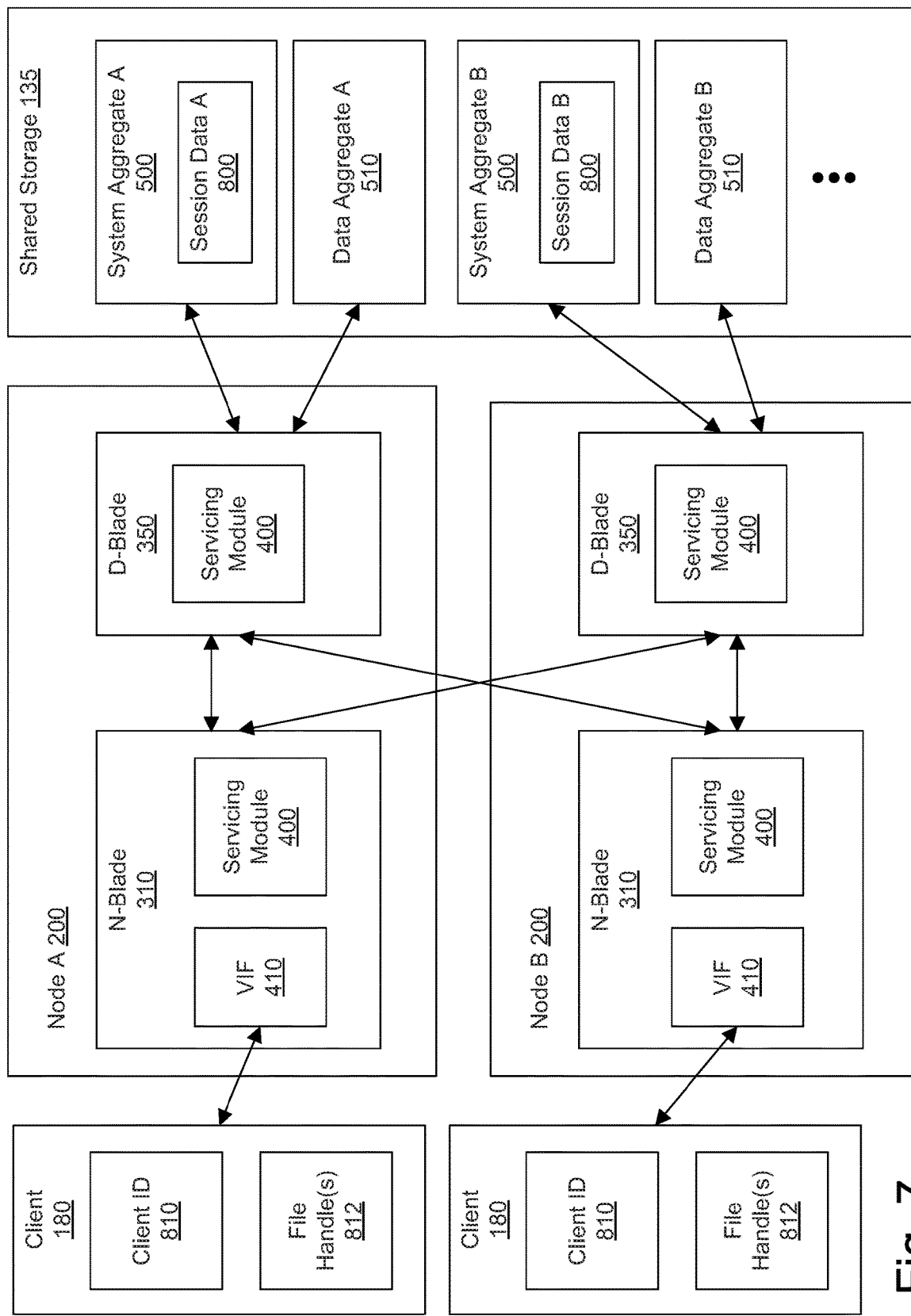
FIG. 7 shows a conceptual diagram of processes performed during client data-access sessions.

FIG. 7 shows a conceptual diagram of processes performed during client data-access sessions. During the data-access sessions, one or more clients 180 may connect with a node 200 to access (read/write) data containers stored on the shared storage 135 of the cluster. As described in some embodiments below, a file (data container) stored in the shared storage 135 may be accessed using a file handle. In other embodiments, however, any other type of data container stored in the shared storage 135 may be accessed using a data container handle. As such, the use of the terms "file" and "file handle" are used for illustrative purposes only. A network port 410/VIF of a node 200 may be used to provide a network connection between the network element 310 of the node 200 and a client 180 for a data-access session.

Figure 8:
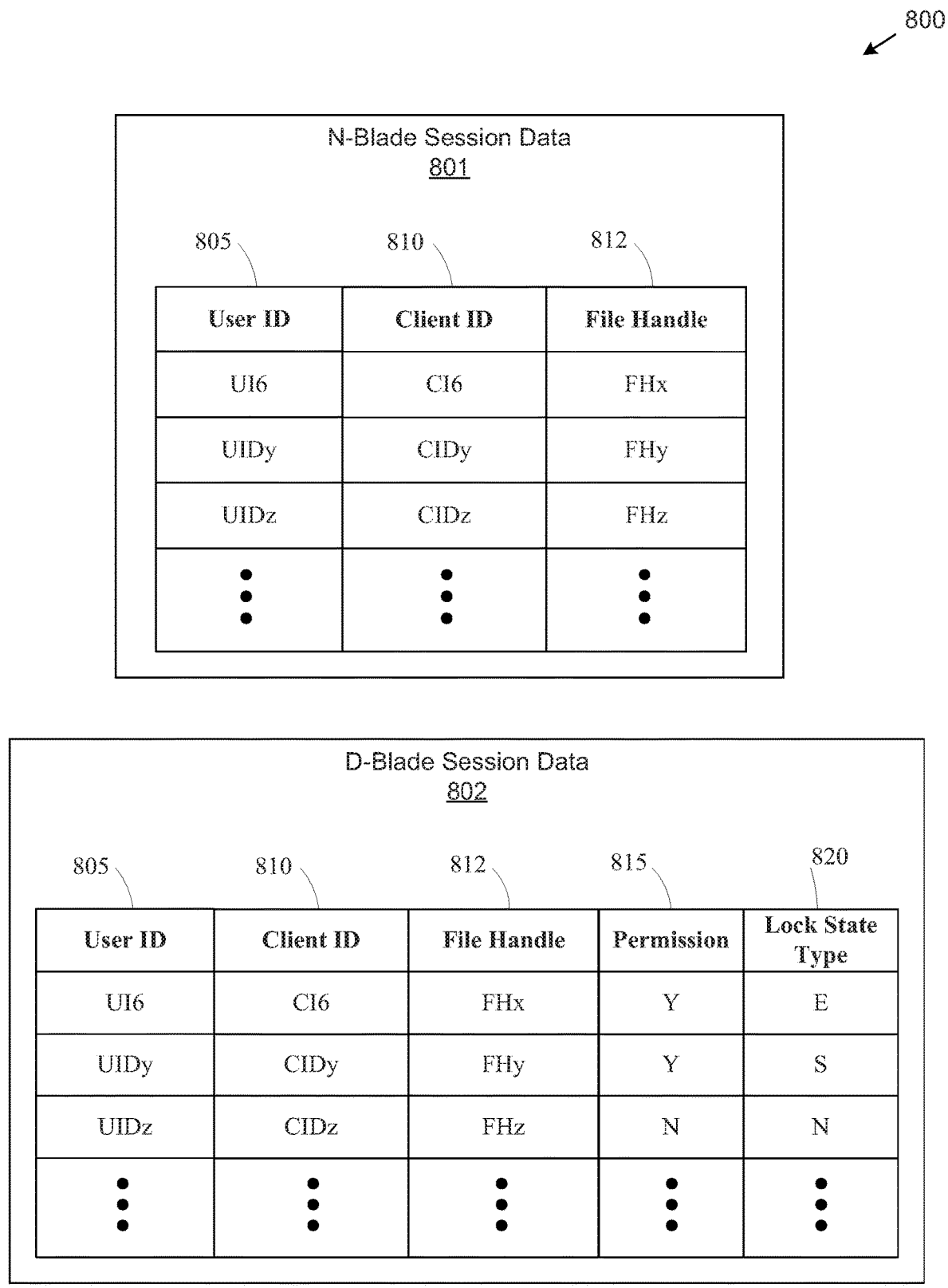
FIG. 8 shows a conceptual diagram of exemplary session data that may be collected and stored to a system aggregate.

During a client data-access session, the network element 310 and disk element 350 of a node 200 may collect and store session data 800 to the system aggregate 500 associated with the node 200. FIG. 8 shows a conceptual diagram of exemplary session data 800 that may be collected and stored to a system aggregate 500. In the example of FIG. 8, the session data 800 is shown as a table having a plurality of entries, however, in other embodiments, the session data 800 may also be stored and organized in different forms other than a table, such as a database, file, or any other data structure.

In the example of FIG. 8, the session data 800 comprises network element session data 801 that is collected and stored by the network element 310 and disk element session data 802 that is collected and stored by the disk element 350. Note that the network element 310 and disk element 350 collecting and storing the session data 800 may reside on different nodes 200. As such, the network element session data 801 and the disk element session data 802 shown in FIG. 8 may be stored on different system aggregates 500. This may occur, for example, if a client 180 connects with the network element 310 of node A (whereby the network element stores its session data to system aggregate A) to access a file serviced by the disk element 350 of node B (whereby the disk element stores its session data to system aggregate B). In general, the network element 310 may collect and store information relating to current connections with clients 180 and the disk element 350 may collect and store information relating to files accessed by currently connected clients 180.

To begin a data-access session with a node, a connection authentication procedure may be performed. For example, to initiate the data-access session with a node, the client 180 may send a connection request to the network element 310. The connection request may contain, for example, a user identification/identifier (ID) and password. Upon authenticating the received client ID and password (e.g., by verifying that the user ID has permission to connect to the cluster 100 and the password is correct), the network element 310 may produce a client ID 810 and send the client ID 810 to the client 180 (which stores the received client ID). Each network element 310 of each node 200 may store information regarding each client 180 that is connected with the network element 310 to its session data 801 in the associated system aggregate 500. As shown in the example of FIG. 8, the network element 310 may store the user ID 805 and the client ID 810 to its session data 801 for each connected client 180.

In some embodiments, the client ID 810 may comprise a unique identifier produced by the network element 310 that uniquely identifies the client 180. A client 180 submitting a valid client ID, that is recognized by the network element 310, indicates to the network element 310 that the client 180 has already undergone the connection authentication procedure. In contrast, a client 180 submitting a user ID or a non-valid client ID, that is not recognized by the network element 310, indicates to the network element 310 that the client 180 has not already undergone the connection authentication procedure. As such, the client 180 may subsequently use the received client ID 810 to connect and interface with the network element 310 (for accessing data stored in the shared storage 135), without having to resend the user ID and password and without the network element 310 having to re-authenticate the connection and reproduce the client ID. Thus use of the client ID 810 by the client 180 and recognition of the client ID 810 by the network element avoids having to re-perform the connection authentication procedure.

After the connection authentication procedure, the client 180 may then send an initial access request for a particular file (referred to as "requested file N") in the shared storage 135. The initial access request may include the client ID (for interfacing with the network element 310), a request type (read/write), data to be written (for write requests), and a virtual address of requested file N. The virtual address of requested file N may comprise a file path specifying, for example, directory, filename, etc. Note that although the client 180 may interface, for example, with network element 310 of node A, the client 180 may request any file in the shared storage 135 (whether the file is stored in data aggregate A or another data aggregate).

The network element 310 receives the initial access request and uses the virtual address of requested file N to determine a disk element identifier (ID). The disk element ID identifies which disk element 350 in the cluster is servicing the requested file N specified by the virtual address (i.e., the primary disk element 350 in the cluster that accesses the data aggregate 510 in which the requested file N is stored). For example, if request file N is stored in data aggregate A, the disk element ID would identify the disk element 350 of node A. The network element 310 then sends the access request, the user ID, and client ID to the appropriate disk element 350 that services the request file N (as specified by the disk element ID).

The disk element 350 receives the initial access request and may perform an access request validation procedure to validate the initial access request (e.g., by determining permission and lock type associated with the client submitting the initial access request). For example, the disk element 350 may use the virtual address of requested file N to determine a file inode number for the requested file N. The disk element 350 may then retrieve and analyze information from the file inode specified by the file inode number. A file inode typically contains metadata for an associated file, such as permission/security and lock metadata.

The permission metadata may specify which users or user types (e.g., administrators) have permission to access the file. Permission metadata may also indicate the type of access permission a user or user type has (e.g., read only, write, etc.). The lock metadata may specify what type of lock a user or user type can obtain when accessing the file. Lock types may include, for example, exclusive (E), shared (S), or none (N). A user/owner having an exclusive lock has exclusive read or write access to the file (whereby all other users/processes are prevented from having read or write access to the file). Typically, only one user is given an exclusive lock on a file. A user/owner having a shared lock has write access to the file (whereby other users/processes are prevented from having write access but are allowed to have read access to the file). Typically, one or more users may be given a shared lock on a file. A user/owner having a none lock has no read or write access lock on the file (whereby all other users/processes are allowed read or write access to the file).

Using the received user ID and the metadata retrieved from the file inode, the disk element 350 determines whether the received access request is valid (i.e., the user/client 180 has permission to perform the specific access request on the requested file N). If so, the disk element 350 may then perform the received access request on the requested file N (e.g., read data from or write data to file N) that is stored in its associated data aggregate 510. The disk element 350 may send a message to the network element 310 indicating that the access request has been performed.

The disk element 350 may also form a file handle for the requested file N, the file handle comprising the disk element ID (produced by the network element 310) and the file inode number (produced by the disk element 350). The file handle of a file may comprise a physical address indicating where the file is stored in the shared storage 135. As such, the network element 310 and disk element 350 together translate/map the received virtual address of requested file N (e.g., file path) to a physical address that may be used for locating and accessing requested file N in the shared storage 135. The disk element 350 may send the file handle of requested file N to the network element 310.

The network element 310 then sends the file handle of file N to the client 180 which stores the file handle 812. Thereafter, the client 180 then includes, along with the client ID, the file handle 812 (rather than the file path) in subsequent access requests (after the initial access request) for file N. Submitting the file handle (physical address) of file N in subsequent access requests for file N avoids the user/client having to re-submit the file path (virtual address) of file N and also allows for more efficient processing of the subsequent access requests by the network element 310 and disk element 350. Since the file handle provides a detailed path to where the requested file is physically stored in the shared storage 135, the requested file may be directly accessed using the file handle, thereby avoiding having to again translate/map between a file path (virtual address) and the file handle (physical address).

The network element 310 may store the file handle 812 to its session data 801 and associate the file handle 812 with the corresponding user ID 805 and client ID 810 (that identify the user/client that obtained and is using the file handle 812). The user ID 805/client ID 810 and associated file handle 812 may comprise a single entry in the network element session data 801.

The disk element 350 may also store information to its session data 802 in its associated system aggregate 500. As shown in the example of FIG. 8, the disk element 350 may store to its session data 802 the user ID 805 and the client ID 810 (received from the network element) and the associated file handle 812. The disk element 350 may also store to its session data 802, a permission flag 815 and lock state type 820 associated with a specific combination of a particular client ID 810 (or user ID 805) and a particular file handle 812.

Note that the user ID 805 and the client ID 810 both uniquely identify a user/client that is accessing the shared storage 135 and the file handle 812 uniquely identifies a file stored in the shared storage 135. Since each user/client may be simultaneously storing and using multiple file handles (for accessing multiple files in the shared storage 135) and each file handle may be simultaneously stored and used by multiple users/clients (to simultaneously access the same file), the permission flag 815 and lock state type 820 is associated (in the session data 802) with a specific combination of a particular client ID 810 (or user ID 805) and a particular file handle 812. In some embodiments, each combination of a particular client ID 810 (or user ID 805) and a particular file handle 812 and the associated permission flag 815 and lock state type 820 may comprise a single entry in the disk element session data 802. In these embodiments, the entries of the disk element session data 802 may be indexed by the combination of a client ID 810 (or user ID 805) and a file handle 812.

As discussed above, after the initial access request for file N (which is used to produce the file handle 812), the client 180 then includes the client ID 810 and the file handle 812 in subsequent access requests for file N. The client ID 810 may be used to interface with the network element 310 (e.g., by using the VIF specified by the client ID 810). The network element 310 receives the access request from the client and uses the disk element ID in the file handle to identify which disk element 350 to route the access request. The network element 310 then sends the access request (having the client ID 810 and the file handle 812) to the appropriate disk element 350 to validate and perform the access request.

The disk element 350 may validate the access request by locating an entry ("matching entry") in the disk element session data 802 indexed by the received client ID 810 and file handle 812 combination. The disk element 350 may then analyze the permission flag 815 and lock state type 820 (as found in the matching entry) that is associated with the client ID 810 and file handle 812 combination. By doing so, the disk element 350 may determine whether the received access request is valid (i.e., the user/client 180 has permission to perform the specific access request on the requested file N). If so, the disk element 350 performs the access request.

As discussed above, the lock metadata in the file inode may specify what type of lock a user or user type can obtain when accessing the file, such as exclusive (E), shared (S), or none (N). Assuming the client 180 (specified by the user ID 805) has permission to access the requested file N (specified by the file handle 812), the disk element 350 may record the lock state type 820 given to the client 180 for requested file N. Lock state data 820 may be stored to session data 800 to provide data consistency across multiple data-access sessions with multiple clients 180. Where two or more clients 180 may simultaneously attempt to write to the same file, the lock state data 820 may be used to determine which client (if any) is permitted to write to the file and to prevent two simultaneous write requests being performed on the same file (which would cause data inconsistency).

For example, a first client 180 may be given an exclusive lock state on file N, which is reflected in the lock state data 820 for the first client 180 (as identified by the user ID 805 or client ID 810) in the session data 800. As such, a subsequent second client 180 will not be given an exclusive lock state on file N, which is reflected in the lock state data 820 for the second client 180 in the session data 800. If both the first and second clients attempt to perform a write request on file N, the disk element 350 will check the lock state data 820 in the session data 800 to determine which client (if any) is permitted to write to file N. In this example, the disk element 350 will determine that only the first client has the exclusive lock state and is permitted to write to file N, thus preventing two clients from writing to the same file at the same time.

B. Dropped Connections

During a client data-access service, however, the connection between the client 180 and the network element 310 may be dropped/disconnected whether intentionally or unintentionally. For example, client connections may be intentionally dropped when performing servicing of the network elements or disk element software components of the nodes of the cluster. Under previous network file protocols (such as SMB 1.0) in previous Windows® operating systems installed on clients 180), upon a network disconnection, the client 180 was configured to immediately drop/delete the file handle(s) obtained by the client 180. Also, when a connection failed, SMB 1.0 nodes were configured to close all open file handles. As such, for each disconnected client, each previous file handle must be reproduced.

In the current network file protocols (such as SMB 2.0 in current Windows® operating systems installed on clients 180), upon a network disconnection, the client 180 is configured to drop/delete the file handle(s) obtained by the client 180 only after a predetermined grace time period after the initial connection failure occurs. During this predetermined grace period, the client 180 may also be configured to automatically perform a predetermined number of reconnection attempts (e.g., 5 attempts under SMB 2.0). If a reconnection is not successful after the predetermined number of reconnection attempts, the client 180 may be configured to drop/delete the previous file handle(s) obtained by the client 180. If within the predetermined number of reconnection attempts, a reconnection is successful, the client 180 may be configured to retain the previous file handles and re-use the file handles to access the same files, without needing to re-open the files and reproduce new file handles. The file handles under of SMB 2.0 are sometimes referred to as "durable file handles." The durable file handles feature was designed to allow clients 180 to retain file handles for a grace period after a network disconnect to increase the reliability of the protocol when used over networks experiencing frequent network disconnects (such as wireless networks).

When the network element and disk element software components of a node are being serviced (referred to herein as the "serviced" network element, disk element, and node), the serviced node may be considered to have "failed" since it may be taken offline for servicing. As such, the partner node (and thereby the partner network element and partner disk element) are configured to take over the work load of the serviced node, whereby the partner network element begins performing the functions previously performed by the serviced network element and the partner disk element begins performing the functions previously performed by the serviced disk element. Note that the partner disk element is allowed to access the data aggregate 510 of the serviced disk element in a failover-type event (such as servicing of the disk element).

Conventionally, the disconnected clients may attempt to reconnect with the partner node to access files serviced by the partner node that were previously requested (and which file handles were obtained). In particular, a disconnected client may attempt to reconnect with the partner network element using the previously obtained client ID (referred to as the "original" client ID) and attempt to re-access previously requested files using the file handles (referred to as the "original" file handles) stored to the client 180. The system aggregate 500 associated with the partner node, however, will not have the session data 800 that was collected and stored by the serviced node (which is stored on the system aggregate 500 associated with the serviced node), and thus the partner node will not have access to the session data 800 of the serviced node.

As such, the partner network element will not have access to the network element session data 801 collected by the serviced network element, which includes user IDs 805 and "original" client IDs 810 of clients 180 that were previously connected to the serviced network element and are now attempting reconnection to the partner network element. Since the partner network element does not have access to this network element session data 801 of the serviced network element, the partner network element will not recognize the original client IDs 810 sent by the clients 180 attempting reconnection to the partner network element and may refuse the reconnection of the clients 180. As such, re-authentication of the client connection may need to be performed and a "new" client ID produced. For example, the client 180 may submit a user ID and password and the partner network element may verify that the user ID has permission to connect to the cluster 100 and then produce a new client ID.

Similarly, the partner disk element will not have access to the disk element session data 802 collected by the serviced disk element, which includes original client IDs 810 and original file handles 812 obtained by clients 180 that were previously connected to the serviced disk element, along with permission data 815 and lock state data 820 associated with each client ID 810 and file handle 812 combination. The clients 180 may then attempt to access the previously opened/accessed files using access requests containing the original client IDs 810 and original file handles 812, the access requests being sent to the partner disk element for processing. However, since the partner disk element does not have access to this disk element session data 801 of the serviced disk element, the partner disk element will not recognize the original client IDs 810 and original file handles 812 in the access requests and will not be able to validate and perform the access requests. As such, generation of new file handles for the previously opened/accessed files may need to be performed. For example, the client 180 may submit a virtual address of the requested file and the network element 310 and disk element 350 may translate/map the virtual address to a file handle (physical address) of the requested file.

As described above, since the partner network element will not have access to the network element session data 801 of the serviced network element, re-authentication of connections for clients 180 attempting reconnection to the partner network element may need to be performed (whereby a new client ID produced). Also, since the partner disk element will not have access to the disk element session data 802 of the serviced disk element, re-generation of file handles for the previously opened/accessed files may need to be performed. So during servicing of the network element and disk element software components of a node, although the original client IDs and file handles may have been retained by the clients 180 through the network disconnection, they may be useless since the partner network element and partner disk element will not recognize the original client IDs and file handles and new client IDs and file handles may need to be produced regardless. Therefore, conventionally, servicing of the network element and disk element software components of a node may be substantially disruptive to clients 180 using the node 200.

V. Servicing of Software Components of a Node

In some embodiments, the storage operating system 300 comprises a servicing module 400 for performing servicing on the network element 310 and/or disk element 350 software components of one or more nodes 200 of a cluster. For example, the servicing module 400 may perform upgrading, re-installing, maintenance, repairing, etc. of the network element 310 and/or disk element 350 software components of a node. The network element 310 and disk element 350 may each comprise a servicing module 400. The servicing modules 400 in each blade may operate in conjunction to perform servicing of the network element 310 and/or disk element 350. For example, the servicing modules 400 may issue CF messages or other commands to the network element 310 and disk element 350 to perform the methods described herein. After initiation (e.g., by an administrative command received at message interface 450), the servicing modules 400 may do so automatically (without human intervention) for one or more nodes 200 of a cluster 100 with reduced disruption to clients 180 connected to the nodes 200.

For illustrative purposes, in the description below, the network element and/or disk element of node A are being serviced and are referred to as the "serviced" network element and disk element. Node A is assigned/associated with system aggregate A and data aggregate A. The serviced network element stores and uses network element session data A 801 in system aggregate A and the serviced disk element stores and uses disk element session data A 802 in system aggregate A. The serviced disk element also services data in data aggregate A in response to received access requests.

For illustrative purposes, in the description below, Node B is the predetermined failover partner of node A. As such, the network element and disk element of node B are referred to as the "partner" network element and disk element. The partner network element is configured to begin performing the functions of the serviced network element upon the serviced network element being taken offline. Likewise, the partner disk element is configured to begin performing the functions of the serviced disk element upon the serviced disk element being taken offline. Node B is assigned/associated with system aggregate B and data aggregate B. The serviced network element stores and uses network element session data B 801 in system aggregate B and the partner disk element stores and uses disk element session data 802 in system aggregate B. The partner disk element services data in data aggregate B in response to received access requests. The partner disk element is also configured to service data in data aggregate A upon the serviced disk element being taken offline.

For illustrative purposes, in the description below, a client 180 is configured under current network file protocols (such as SMB 2.0). In these embodiments, upon a connection failure with an network element, the client 180 is configured to retain a client ID and any file handles (for accessing particular files) received prior to the connection failure for a predetermined grace time period. During this predetermined grace period, the client 180 may also be configured to automatically perform a predetermined number of reconnection attempts (e.g., 5 attempts under SMB 2.0). If a reconnection is successful, the client 180 may be configured to retain the previous client ID and file handles and re-use the previous client ID and file handles to access the same files.

In some embodiments, only the network element 310 software component of one or more nodes 200 of a cluster is serviced. In other embodiments, only the disk element 350 software component of one or more nodes 200 of a cluster is serviced. In further embodiments, the network element 310 and disk element 350 software components of one or more nodes 200 of a cluster are serviced. It may be desirable to service only the network element 310 or only the disk element 350 in some situations. For example, if there is only an upgrade available for the network element 310, or only the network element 310 requires repair, it is desirable to only service the network elements 310 of the cluster 100 without also taking the disk elements 350 offline for servicing. This is advantageous since the network element 310 and disk element 350 of a node can still operate while the other is being serviced.

VI. Servicing of Network Element Software Component of a Node

Figure 9A:
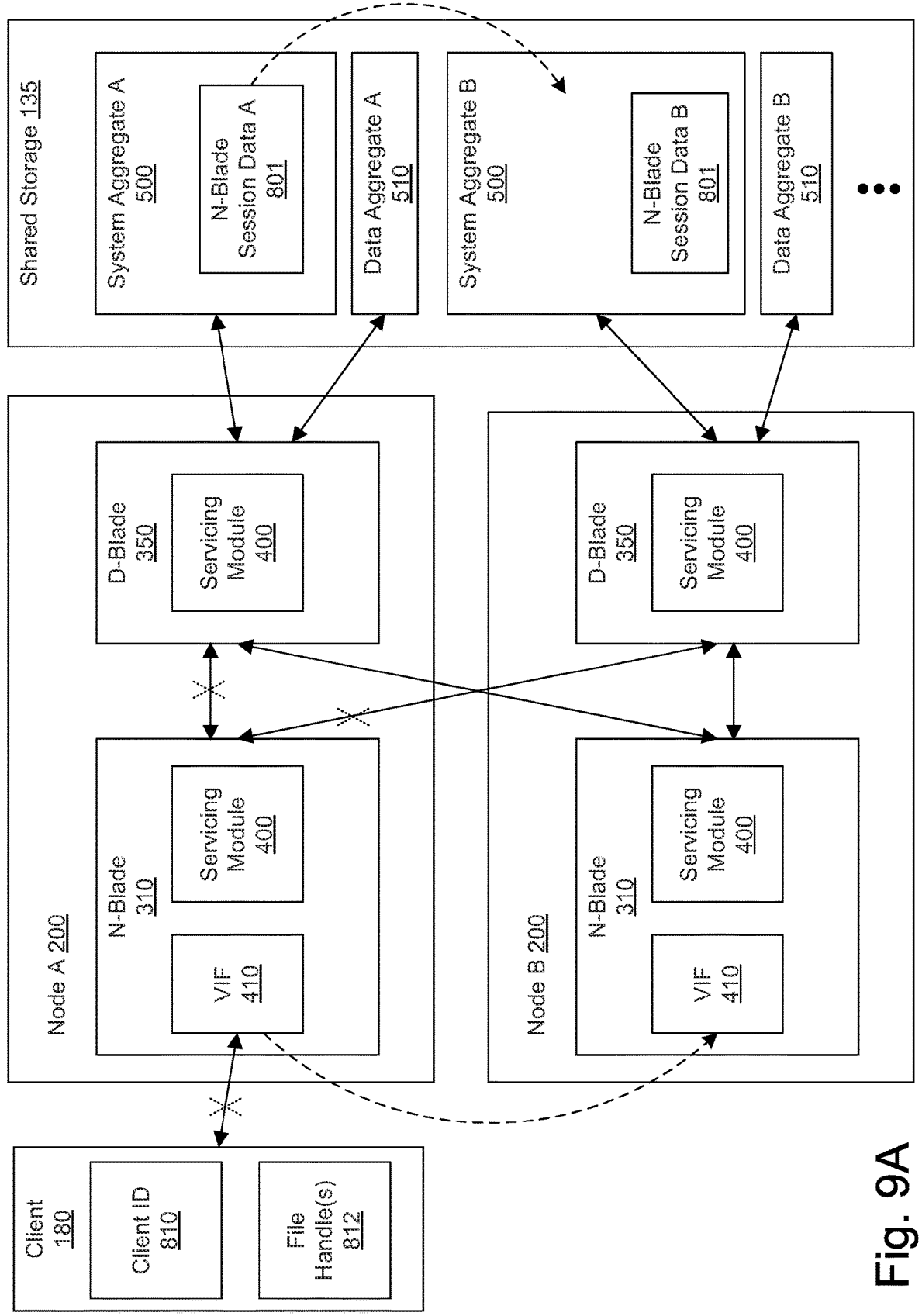
FIG. 9A-C show conceptual diagrams of processes performed for servicing of the network element software component of one or more nodes of a cluster.
Figure 9B:
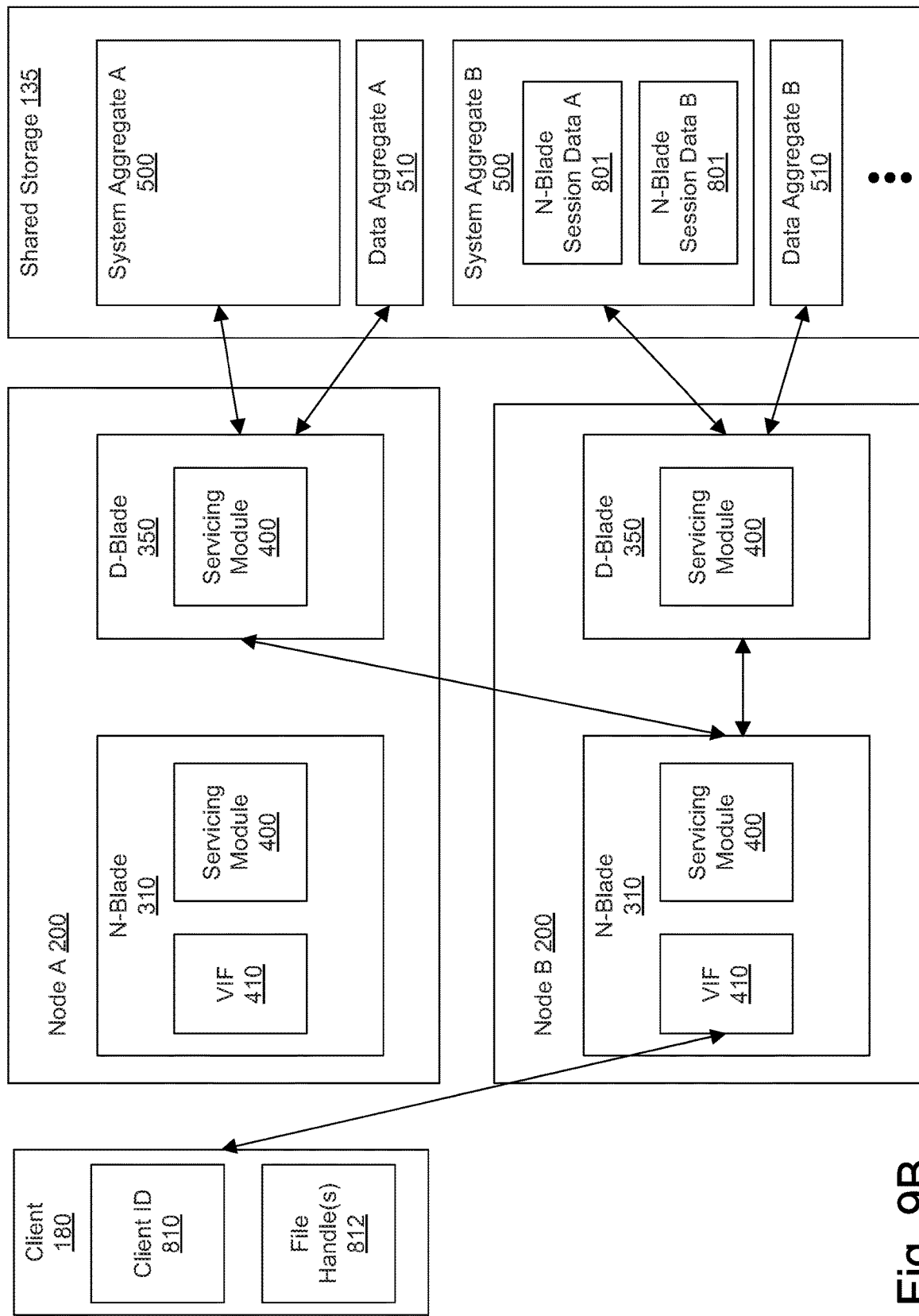
Figure 9C:
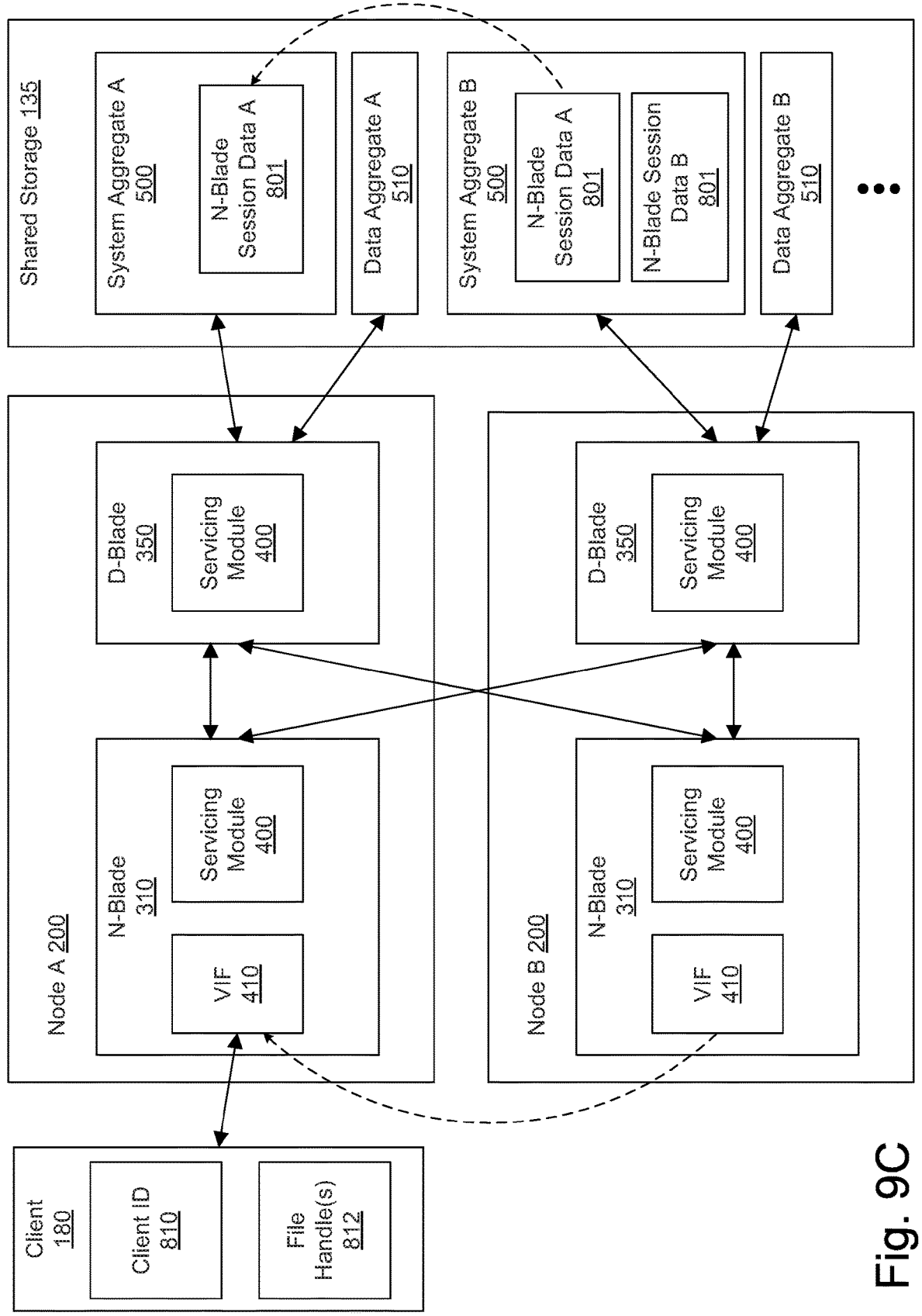

FIG. 9A-C show conceptual diagrams of processes performed for servicing of the network element 310 software component of one or more nodes 200 of a cluster 100. Servicing of the network element 310 may be initiated, for example, by administrative command received at message interface 450 specifying servicing of the network element 310. The servicing modules 400 in the network element 310 and disk element 350 may then perform (in conjunction) the servicing automatically (without human intervention) for one or more nodes 200 of a cluster 100. Upon initiation, servicing of the network elements of the cluster 100 begins with a first node (serviced node A), and is repeated for each node of the cluster.

As shown in FIG. 9A, the servicing module 400 may take the serviced network element 350 of node A offline (as indicated by the "X" mark through the connections of the serviced network element 350) so it can no longer perform client data-access sessions (i.e., can no longer receive or send data relating to client data-access sessions). As such, the serviced network element 350 can no longer receive access requests from clients 180 and route the access requests to the appropriate disk element 310.

Taking the serviced network element 350 offline also closes all network ports 410 of the serviced network element 350. Doing so prevents clients 180 from making new network connections to the serviced network element 350 and forces network disconnection with all clients 180 currently connected to the serviced network element 350 for a data-access session. As discussed above, the network ports 410 may be implemented as VIFs. A VIF may transparently change association from one network port 410 to another network port 410 within the same node 200 or across different nodes 200. As shown in FIG. 9A, any VIFs of the closed network ports 410 of the serviced network element 310 may migrate/change association to open network ports 410 of the partner network element 310. In this way, as shown in FIG. 9B, data-access to any clients 180 formerly connected to the serviced network element 310 may connect to the partner network element 310 for continuing a data-access session. The serviced network element 350 software component then begins to be serviced. For example, the serviced network element 350 may be upgraded (by loading new network element 350 software on the serviced node A), re-installed, maintenanced, or repaired.

The servicing module 400 may then provide access to session data A to the partner network element 310. For example, as shown in FIG. 9A, the servicing modules 400 may begin transferring network element session data A 801 stored in system aggregate A to system aggregate B for storage. In some embodiments, the network element session data A 801 is transferred through a network, such as the cluster switching fabric 150. For example, the servicing module 400 on serviced node A may send a CF message to the servicing module 400 on partner node B to prepare to receive session data. The servicing module 400 on serviced node A may then begin sending the network element session data A 801 from system aggregate A to partner node B through the cluster switching fabric 150. The servicing module 400 on partner node B then receives and stores the network element session data A 801 to its system aggregate B. As such, the partner network element 310 will have access to the network element session data A 801 stored in system aggregate B. Thus, the partner network element 310 will have access to the user IDs 805, client IDs 810, and the file handles 812 obtained by clients 180 previously connected to the serviced network element 310.

Each client 180 previously connected to the serviced network element 310 will experience a network disconnection (upon the forced disconnection) and will begin to attempt reconnections (e.g., 5 attempts under SMB 2.0) with the partner network element 350 (while retaining any client ID 810 and file handles 812 received from the serviced network element 350 prior to the network disconnection). Each disconnected client 180 may attempt reconnections with the partner network element 350 using the client ID 810 received from the serviced network element 350 prior to the network disconnection.

If the network element session data A 801 has not been transferred to system aggregate B yet, the partner network element will not have access to the network element session data A 801 yet. Thus, the partner network element will not recognize the client IDs 810 sent by the clients 180 attempting reconnection to the partner network element and may refuse the reconnection of the clients 180. Typically, however, the network element session data A 801 will be transferred to system aggregate B within the predetermined grace time period and the 5 attempted reconnections under SMB 2.0.

Once the network element session data A 801 is transferred to system aggregate B, the partner network element will have access to the network element session data A 801 and will then recognize the client IDs 810 sent by the clients 180 attempting reconnection. As such, the partner network element will begin accepting the connection attempts based on the received client IDs and session data A. For example, the partner network element may compare a received client ID with the client IDs in network element session data A 801. If a matching client ID is found in network element session data A 801, the partner network element may accept the connection attempt. Thus, the partner network element may accept the connection of a client using an original client ID without having to perform the connection authentication procedure with the client (whereby re-authentication of the client connection and generation of a new client ID would need to be performed). However, if a match is not found, the partner network element may refuse the connection attempt (based on the client ID) and require that the client re-perform the connection authentication procedure.

After a client 180 is reconnected with the partner network element 310 (as shown in FIG. 9B), the partner network element 310 begins receiving access requests from the client 180. The received access requests may contain the original client ID and original file handles (for previously opened files) received from the serviced network element 310 (which the client retained as part of the durable handles feature of SMB 2.0). The partner network element then processes the access requests based on the original file handles (e.g., by routing, using the original file handles, the access requests to the appropriate disk element 350 for processing).

The receiving disk element 350 uses the original client ID and original file handle to validate the access request to a previously opened file (e.g., by analyzing the permission and lock state data associated with the original client ID and original file handle combination). As such, the original file handles may be used to access client's previously opened files, without requiring closing of previously opened files and generation of new file handles for the previously opened files by the partner node. Also, the permission and lock type of the requested file does not need to be re-determined for the client 180.

While servicing the reconnected clients 180, the partner network element 310 may collect and store new information to the network element session data A 801. For example, a reconnected client 180 may request access to a new file, whereby a new file handle 812 is produced and stored to the network element session data A 801. As such, during the servicing of serviced network element 310, the partner network element 310 collects network element session data A 801 and network element session data B 801 which are both stored in system aggregate B. In these embodiments, network element session data A 801 and network element session data B 801 are kept separate (e.g., in different data structures) in system aggregate B so the data does not intermingle.

Upon the servicing of the serviced network element being completed, the servicing modules 400 then begin to transfer network element session data A 801 (which may or may not contain new information) stored in system aggregate B to system aggregate A for storage (as shown in FIG. 9C). The servicing modules 400 may use similar data transfer methods described above. The serviced network element 350 is then brought back online so it can resume client data-access sessions by receiving access requests from clients 180 and routing the access requests to the appropriate disk element 310 (as shown in FIG. 9C). The serviced network element 310 may do so using the network element session data A 801. As shown in FIG. 9C, for the clients 180 previously connected with the serviced network element, the VIFs that currently connect these clients 180 with the partner network element are changed back to associate to a network port 410 on the serviced network element.

The above process may be repeated for each node in the cluster, whereby each network element in the cluster is serviced in turn. For example, if the cluster comprises node A and node B, each being the failover partner of the other, the above process would be repeated where node A is replaced by node B and vice versa. By performing servicing on one node in the cluster at a time, the entire cluster system does not need to be taken offline, thus reducing disruption to client data-access.

Figure 10A:
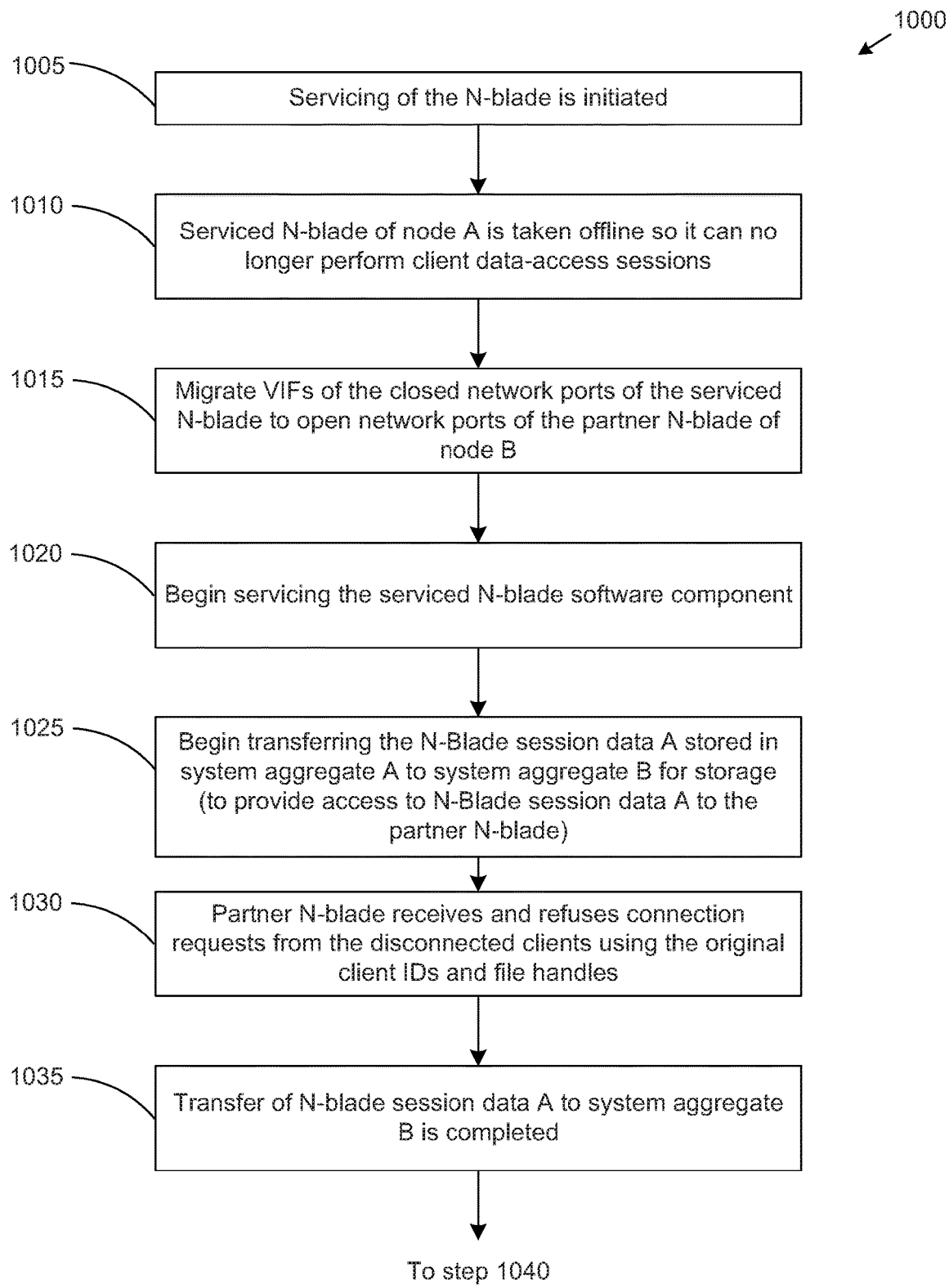
FIG. 10A-B are flowcharts of a method for performing servicing on the network element software component.
Figure 10B:
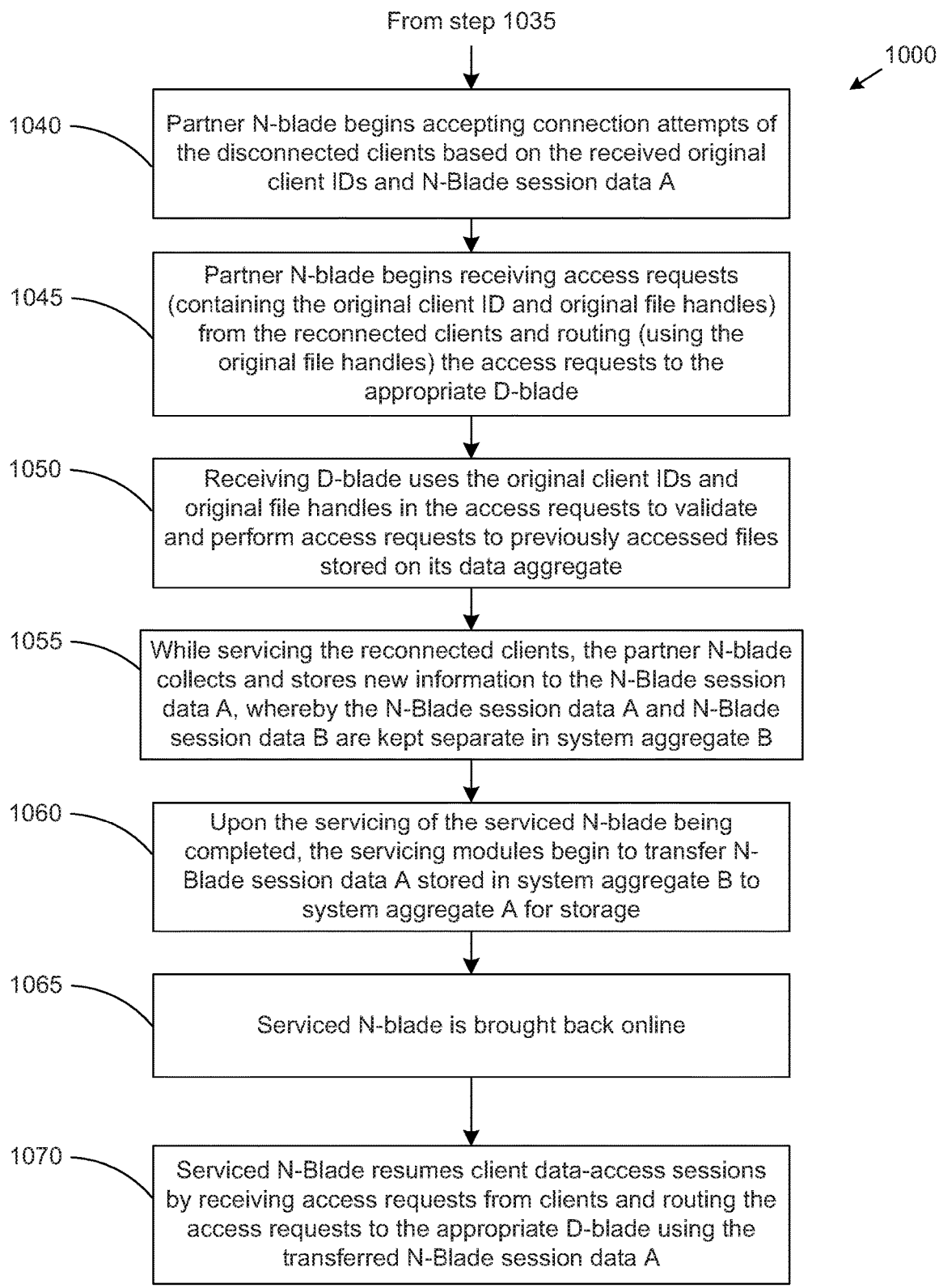

FIG. 10A-B are flowcharts of a method 1000 for performing servicing on the network element 310 software component of one or more nodes 200 of a cluster. In some embodiments, some of the steps of the method 1000 are implemented by software or hardware. In some embodiments, some of the steps of method 1000 are performed by the servicing modules 400 of the network element 310 and disk element 350 software components. The order and number of steps of the method 1000 are for illustrative purposes only and, in other embodiments, a different order and/or number of steps are used.

The method 1000 begins when servicing of the network element 310 is initiated (at step 1005). For example, servicing may be initiated by an administrative command received by a message interface module 450. In some embodiments, after initiation, some or all of the servicing steps may be performed automatically (without human initiation or intervention) for one or more nodes 200 of a cluster 100. Upon initiation, servicing of the network elements of the cluster 100 begins with a current node (serviced node A) having a partner node (partner node B), and is repeated for each node of the cluster.

The serviced network element 350 of node A is then taken offline (at step 1010) so it can no longer perform client data-access sessions (i.e., can no longer receive access requests from clients 180 and route them to the appropriate disk element 310), whereby all network ports 410 of the serviced network element 350 are closed. Closing the network ports 410 forces a network disconnection with all clients 180 currently connected to the serviced network element 350 for a data-access session. The VIFs of the closed network ports 410 of the serviced network element 310 then migrate/change association (at 1015) to open network ports 410 of the partner network element 310 of node B. Each disconnected client 180 will begin to attempt reconnections (e.g., 5 attempts under SMB 2.0) with the network ports 410 of the partner network element 350 (while also retaining any "original" client ID 810 and file handles 812 received from the serviced network element 350 prior to the network disconnection).

After the serviced network element 350 is taken offline, the method 1000 begins servicing (at 1020) the serviced network element 350 software component (e.g., upgrading, etc.). Also, the method 1000 begins transferring (at 1025) the network element session data A 801 stored in system aggregate A to system aggregate B for storage (e.g., transferred through the cluster switching fabric 150). This is to provide access to network element session data A 801 to the partner network element. Note that the network element session data A 801 will contain the original client IDs 810 and file handles 812 given to the disconnected clients 180 during data-access sessions with the serviced network element of node A. While the network element session data A 801 is being transferred, the partner network element 350 will receive and refuse (at step 1030) connection requests from the disconnected clients 180 using the original client IDs 810 and file handles 812. Since the partner network element 350 does not yet have access to the network element session data A 801, the partner network element 350 will not recognize the client IDs 810 and may refuse the connection requests.

At step 1035, the transfer of network element session data A 801 to system aggregate B is completed. As such, the partner network element of node B will now have access to the network element session data A 801 and will then recognize the client IDs 810 sent by the clients 180 attempting reconnection. As such, the partner network element will then begin accepting (at 1040) the connection attempts of the disconnected clients 180 based on the received original client IDs and network element session data A 801. For example, the partner network element may compare received client IDs with the client IDs in network element session data A 801. If a matching client ID is found in network element session data A 801, the partner network element may accept the connection attempt by the client 180 sending the matching client ID. Thus, re-performing of the connection authentication procedure may be avoided (whereby re-authentication of the client connection and generation of a new client ID is performed). However, if a match is not found, the partner network element may refuse the connection attempt (based on the client ID) and require that the client re-perform the connection authentication procedure.

The partner network element 310 then begins receiving (at 1045) access requests (containing the original client ID and original file handles) from the reconnected clients 180 and routing (using the original file handles) the access requests to the appropriate disk element 350. The receiving disk element 350 uses the original client IDs and original file handles in the access requests to validate and perform (at 1050) the access requests to previously opened files stored on its data aggregate (e.g., by analyzing the permission and lock state data associated with original client ID and original file handle combinations in its session data 802). While servicing the reconnected clients 180, the partner network element 310 may collect and store (at 1055) new information to the network element session data A 801 (e.g., new file handles), whereby the network element session data A 801 and network element session data B 801 are kept separate in system aggregate B so the data does not intermingle.

Upon the servicing of the serviced network element being completed, the servicing modules 400 then begin to transfer (at 1060) network element session data A 801 (which may or may not contain new information) stored in system aggregate B to system aggregate A for storage. The serviced network element 350 is then brought back online (at 1065) and, for the clients 180 previously connected with the serviced network element, the VIFs that currently connect these clients 180 with the partner network element are changed back to associate to a network port 410 on the serviced network element. The serviced network element then resumes (at 1070) client data-access sessions by receiving access requests from clients 180 and routing the access requests to the appropriate disk element 310 using the transferred network element session data A 801. Then method 1000 then ends. The method 1000 may be repeated for each node in the cluster, whereby each network element in the cluster is serviced in turn. By performing servicing on one node in the cluster at a time, the entire cluster system does not need to be taken offline, thus reducing disruption to client data-access.

VII. Servicing of Disk Element Software Component of a Node

Figure 11A:
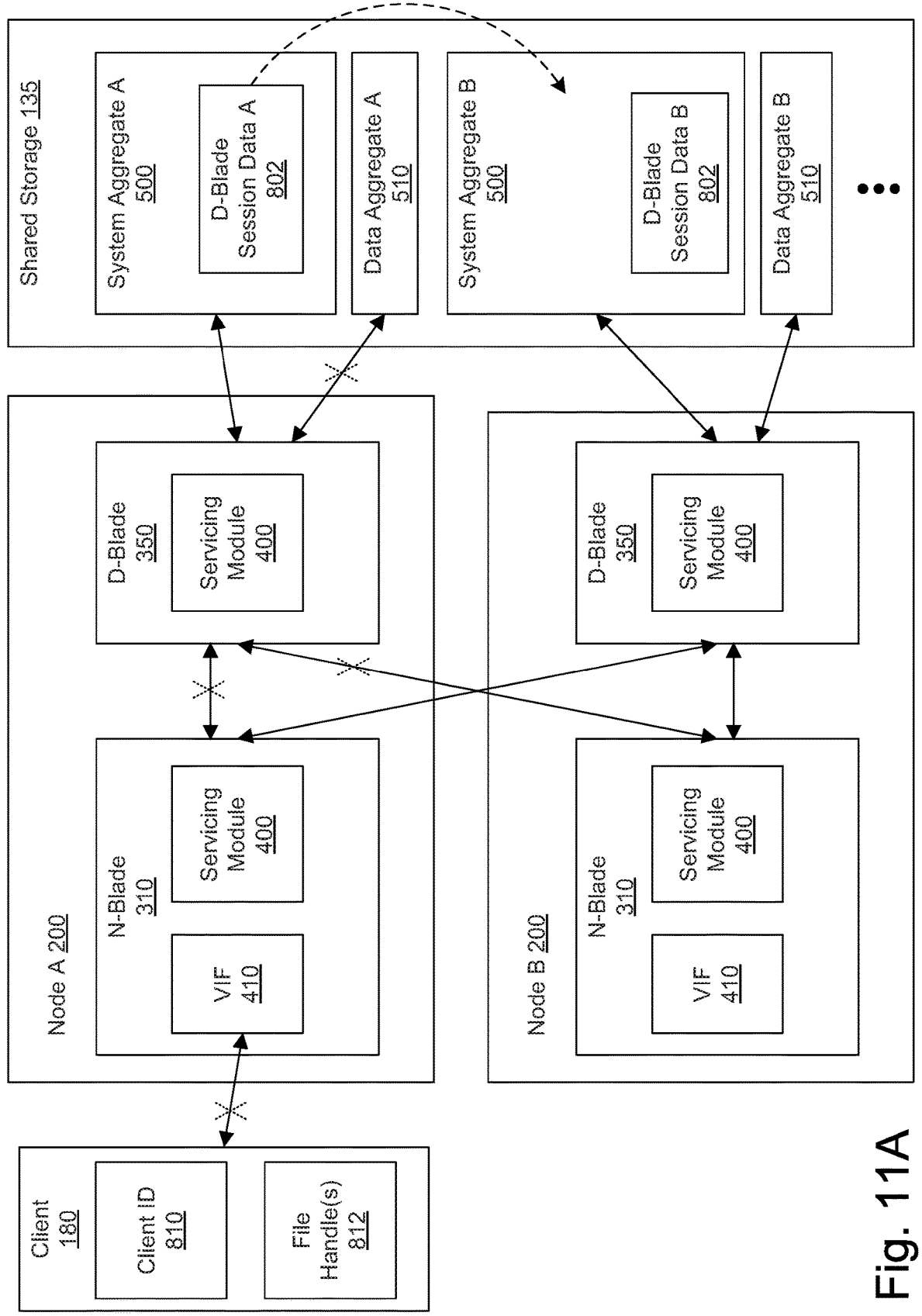
FIG. 11A-C show conceptual diagrams of processes performed for servicing of the disk element software component of one or more nodes of a cluster.
Figure 11B:
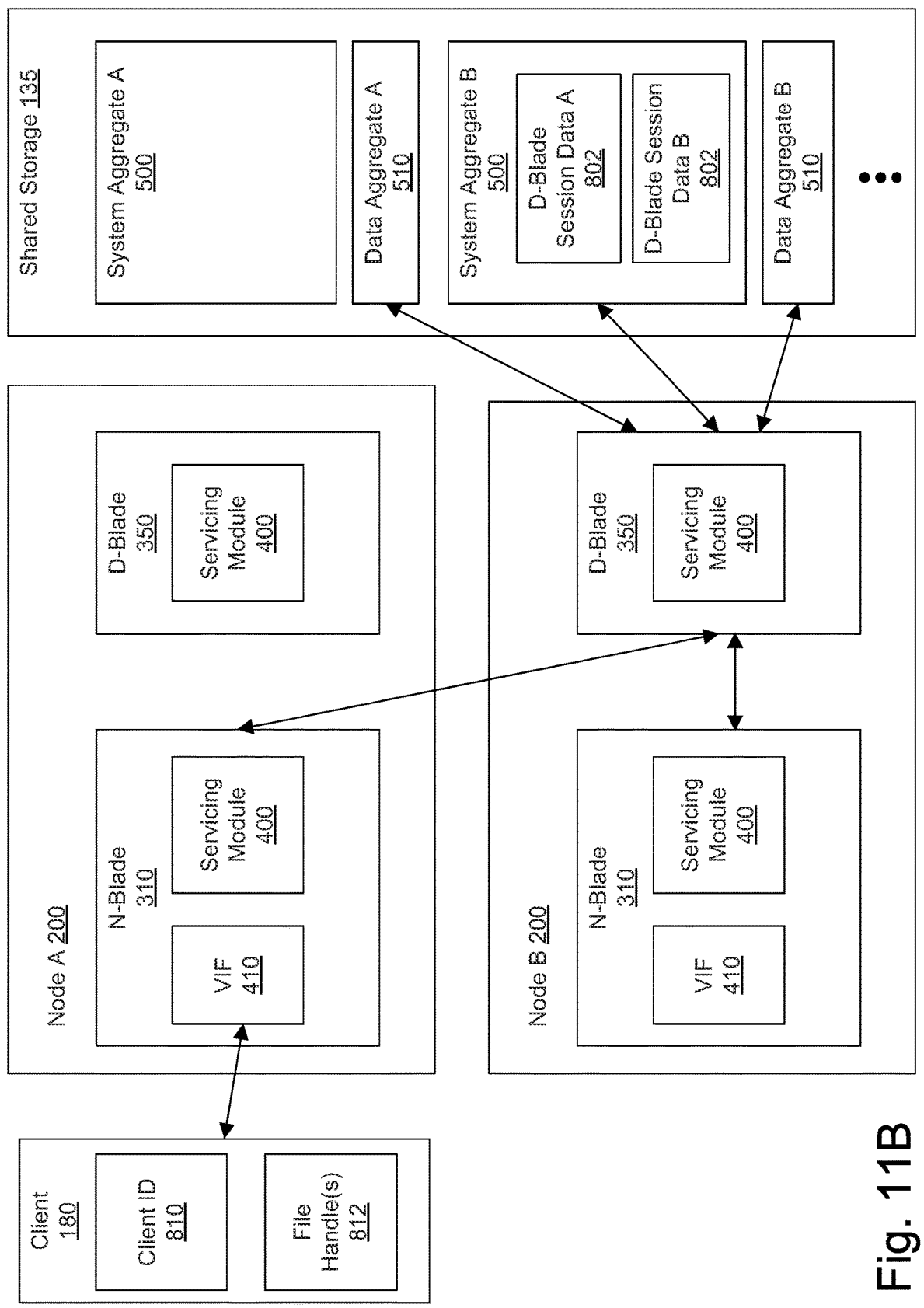
Figure 11C:
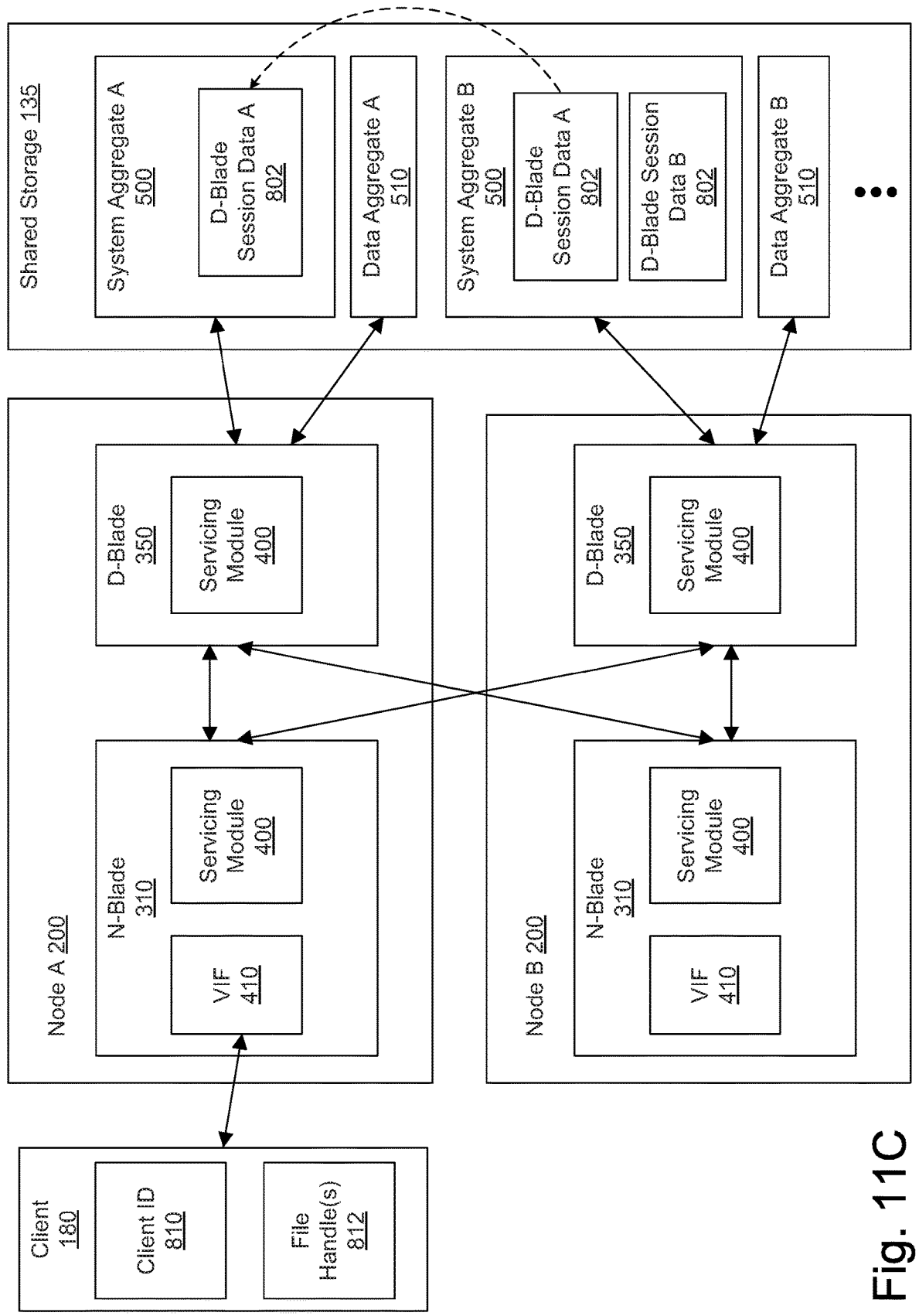

FIG. 11A-C show conceptual diagrams of processes performed for servicing of the disk element 350 software component of one or more nodes 200 of a cluster 100. Prior to servicing, the serviced disk element 350 of node A has stored session data A 802 (e.g., comprising "original" client IDs file handles and permission and lock state data) to the system aggregate A and the partner disk element of node B has stored session data B to the system aggregate B. Also, the serviced disk element services data from data aggregate A and the partner disk element services data from data aggregate B in the shared storage.

Prior to servicing, session data A may contain one or more file handles produced by the serviced node for one or more files (stored on the shared storage) that were accessed using the serviced disk element. Each file handle for a file may be produced by the serviced node for a client submitting an initial access request for the file. The file handle may be produced during an access request validation procedure (performed by the serviced disk element) that validates the initial access request (e.g., by determining permission and lock type associated with the client submitting the initial access request).

Servicing of the disk element 350 may be initiated, for example, by administrative command received at message interface 450 specifying servicing of the disk element 350. The servicing modules 400 in the network element 310 and disk element 350 may then perform (in conjunction) the servicing automatically (without human intervention) for one or more nodes 200 of a cluster 100. Upon initiation, servicing of the disk elements of the cluster 100 begins with a first node (serviced node A), and is repeated for each node of the cluster.

As shown in FIG. 11A, serviced disk element 350 of node A is taken offline (as indicated by the "X" mark through the connections of the serviced disk element 350) so it can no longer perform client data-access sessions. As such, the serviced disk element 350 can no longer receive or perform access requests on the data aggregate A. Each network element 310 in the cluster is also configured to automatically begin to route their access requests to the partner disk element 350 in the event the serviced disk element 350 fails or is taken offline.

For every client 180 having an open file handle (as reflected in the disk element session data A 802) for a file stored on data aggregate A and is accessing the file using a particular network element, the network connection with the client 180 and the particular network element 310 is forced to disconnect by closing the network port 410 that the client 180 is connected with. As such, each client 180 currently accessing a file using the serviced disk element is disconnected. This may be performed by collecting all client IDs 810 from the disk element session data A 802 (stored in system aggregate A) and disconnecting all clients 180 having the collected client IDs 810 from all network elements 310 of the cluster. This may be performed for each network element 310 by determining client IDs 810 in its network element session data 802 (stored in its associated system aggregate) that match the collected client IDs 810, and disconnecting each of these clients 180. In the example of FIG. 11A, the client 180 connected with the network element of node A has an open file handle for a file stored on data aggregate A (i.e., has a client ID 802 listed in disk element session data A 802. Thus the network connection between the client 180 and the network element of node A is forcibly disconnected. In some embodiments, the closed network ports 410 are kept closed until transfer of disk element session data A 802 to system aggregate B (discussed below) is completed.

The serviced disk element 350 software component then begins to be serviced. For example, the serviced disk element 350 may be upgraded (by loading new disk element 350 software on the serviced node A), re-installed, maintenanced, or repaired. As shown in FIG. 11A, the servicing modules 400 then begin transferring disk element session data A 802 stored in system aggregate A to system aggregate B for storage. In some embodiments, the disk element session data A 802 is transferred through a network, such as the cluster switching fabric 150 (as described above).

Each disconnected client 180 will begin to attempt reconnections (e.g., 5 attempts under SMB 2.0) with the network element 310 it was previously connected with (while retaining any client ID 810 and file handles 812 received prior to the network disconnection). Each disconnected client 180 may attempt reconnections using the retained client ID 810. In some embodiments, the closed network ports 410 (causing the network disconnections) of the network elements 310 are kept closed until transfer of disk element session data A 802 to system aggregate B is completed. Until the network ports are re-opened, the attempted reconnections of each client 180 will fail. Typically, however, the disk element session data A 802 will be transferred to system aggregate B within the predetermined grace time period and the 5 attempted reconnections under SMB 2.0.

Once the disk element session data A 802 is completely transferred to system aggregate B, the network ports are re-opened and the disconnected clients will reconnect with their respective network elements 310 (as shown in FIG. 11B). The partner disk element 350 will now have access to the disk element session data A 802 stored in system aggregate B. Thus, the partner disk element 350 will have access to the client IDs 810, file handles 812, permission flag 815 and lock state type 820 data collected for clients 180 for files stored on data aggregate A. The partner disk element will also be configured to have access to data aggregate A upon failure of the serviced disk element (as well as access to data aggregate B per usual).

As shown in FIG. 11B, after the disk element session data A 802 is completely transferred to system aggregate B, the partner disk element 350 may begin servicing data on data aggregate A using the disk element session data A 802. In particular, the partner disk element 350 may begin receiving access requests from the disconnected clients 180. The received access requests may contain the original client ID and original file handles for previously opened files on data aggregate A. The partner disk element 350 may use the original client ID 810 and original file handle 812 to validate an access request to a previously opened file (e.g., by analyzing the permission data 815 and lock state data 820 associated with the original client ID and original file handle combination in the disk element session data A 802). Thus the partner disk element accesses the previously opened files using the original client ID and original file handles, without having to perform an access request validation procedure for the previously opened files and without having to produce new file handles for the previously opened files. Also, the permission and lock type of the requested file does not need to be re-determined for the client 180.

While servicing data on data aggregate A, the partner disk element 350 may collect and store new information to the disk element session data A 802. For example, a reconnected client 180 may request access to a new file, whereby a new file handle 812, new permission data 815, and new lock state data 820 is produced and stored to the disk element session data A 802. As such, during the servicing of serviced disk element 350, the partner disk element 350 collects disk element session data A 802 and disk element session data B 802 which are both stored in system aggregate B. In these embodiments, disk element session data A 802 and disk element session data B 802 are kept separate (e.g., in different data structures) in system aggregate B so the data does not intermingle.

Upon the servicing of the serviced disk element being completed, the servicing modules 400 then begin to transfer disk element session data A 802 (which may or may not contain new information) stored in system aggregate B to system aggregate A for storage (as shown in FIG. 11C). The servicing modules 400 may use similar data transfer methods described above. The serviced disk element 350 is then brought back online so it can resume servicing data on data aggregate A by receiving access requests (from network elements 310) and performing access requests on files stored in data aggregate A (as shown in FIG. 9C). The serviced disk element 350 may do so using the disk element session data A 802. Each network element 310 in the cluster is also configured to automatically begin to route their access requests to the serviced disk element 350 once the serviced disk element 350 is brought back online.

The above process may be repeated for each node in the cluster, whereby each disk element in the cluster is serviced in turn. For example, if the cluster comprises node A and node B, each being the failover partner of the other, the above process would be repeated where node A is replaced by node B and vice versa. If both the network element 310 and disk element 350 software components of the nodes 200 of a cluster are to be serviced, the above described method for servicing the network element and the method for servicing the disk element can be performed on each node. This process may be repeated for each node in the cluster, whereby each node in the cluster is serviced one after the other. By performing servicing on one node in the cluster at a time, the entire cluster system does not need to be taken offline, thus reducing disruption to client data-access.

Figure 12A:
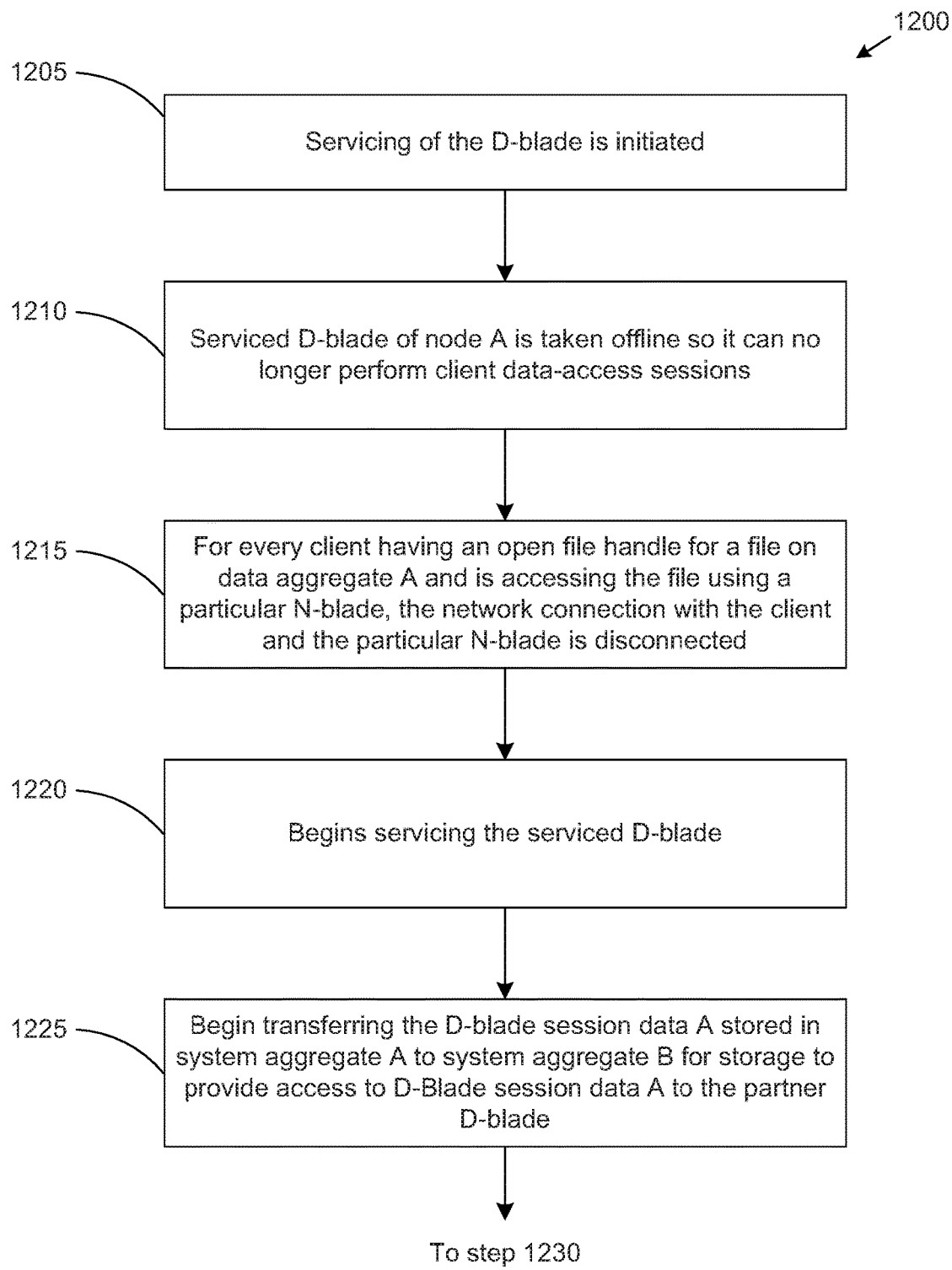
FIG. 12A-B are flowcharts of a method for performing servicing on the disk element software component.
Figure 12B:
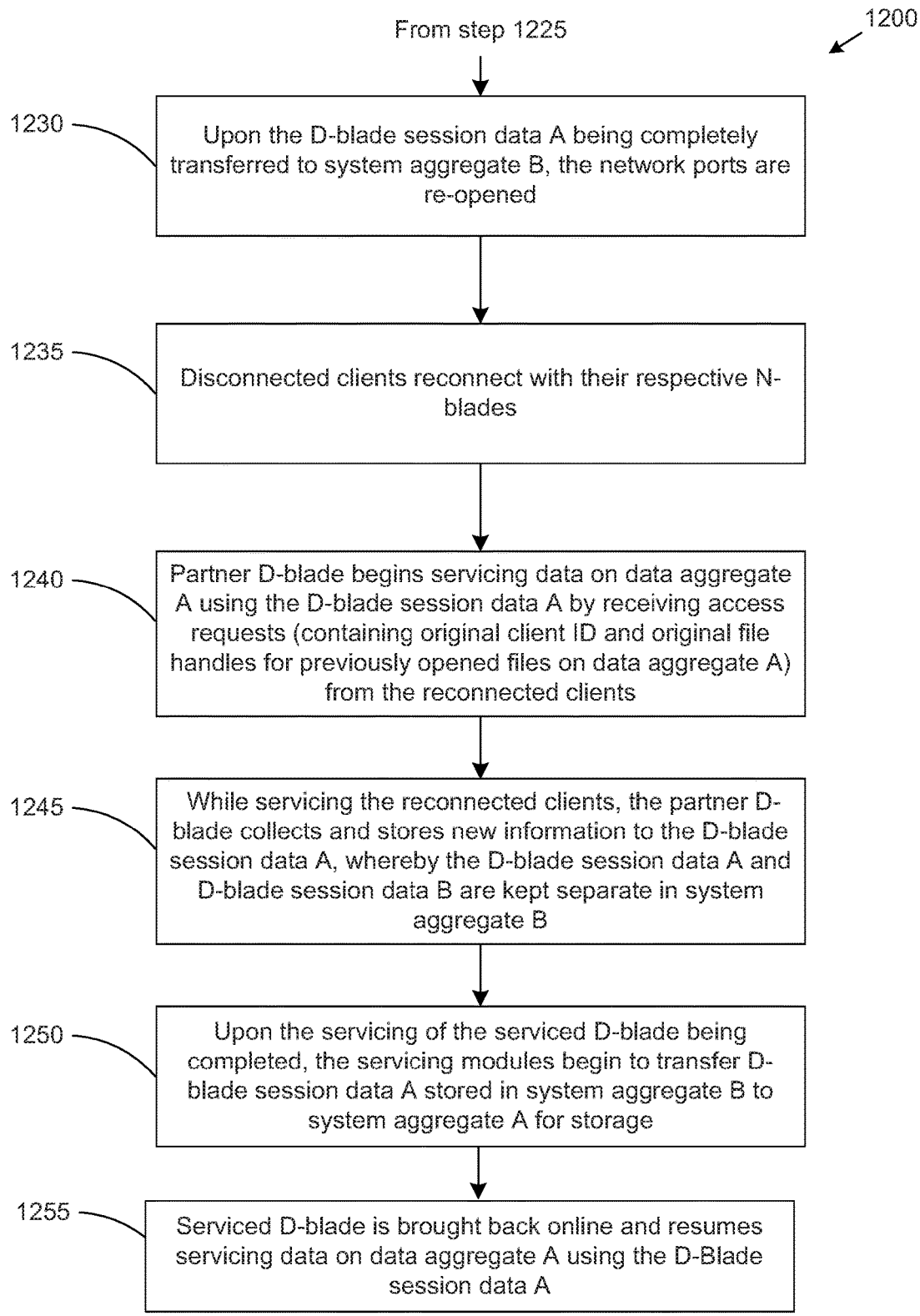

FIG. 12A-B are flowcharts of a method 1200 for performing servicing on the disk element 350 software component of one or more nodes 200 of a cluster. In some embodiments, some of the steps of the method 1200 are implemented by software or hardware. In some embodiments, some of the steps of method 1200 are performed by the servicing modules 400 of the network element 310 and disk element 350 software components. The order and number of steps of the method 1200 are for illustrative purposes only and, in other embodiments, a different order and/or number of steps are used.

The method 1200 begins when servicing of the disk element 350 is initiated (at step 1205). For example, servicing may be initiated by an administrative command received by a message interface module 450. In some embodiments, after initiation, some or all of the servicing steps may be performed automatically (without human initiation or intervention) for one or more nodes 200 of a cluster 100. Upon initiation, servicing of the disk elements of the cluster 100 begins with a current node (serviced node A) having a partner node (partner node B), and is repeated for each node of the cluster.

The serviced disk element 350 of node A is then taken offline (at step 1210) so it can no longer perform client data-access sessions and can no longer receive or perform access requests on the data aggregate A. Each network element 310 in the cluster is also configured to automatically begin to route their access requests to the partner disk element 350 in the event the serviced disk element 350 fails or is taken offline. For every client 180 having an open file handle (as reflected in the disk element session data A 802) for a file stored on data aggregate A and is accessing the file using a particular network element, the network connection with the client 180 and the particular network element 310 is disconnected (at step 1215) by closing the respective network ports 410, whereby the closed network ports 410 are kept closed until transfer of disk element session data A 802 to system aggregate B is completed. As such, each client currently accessing a file using the serviced disk element is disconnected (at step 1215). Each disconnected client 180 is configured to begin to attempt reconnections with the respective network element 310 (while also retaining any original client ID 810 and file handles 812).

The method 1200 begins servicing (at 1220) the serviced disk element 350 software component (e.g., upgrading, etc.). Also, the method 1200 begins transferring (at 1225) the disk element session data A 802 stored in system aggregate A to system aggregate B for storage. This is to provide access to disk element session data A 802 to the partner disk element. Upon the disk element session data A 802 being completely transferred to system aggregate B, the network ports are re-opened (at step 1230). The partner disk element 350 will now have access to the disk element session data A 802 (stored in system aggregate B) for files stored on data aggregate A. The partner disk element will also be configured to have access to data aggregate A upon failure of the serviced disk element.

The disconnected clients will reconnect (at step 1235) with their respective network elements 310. The partner disk element 350 may begin servicing data (at step 1240) on data aggregate A using the disk element session data A 802 by receiving access requests (containing original client ID and original file handles for previously opened files on data aggregate A) from the reconnected clients 180. The partner disk element 350 may use the original client ID 810 and original file handle 812 to validate an access request to a previously opened file (e.g., by analyzing the permission data 815 and lock state data 820 associated with the original client ID and original file handle combination in the disk element session data A 802).

While servicing the reconnected clients 180, the partner disk element 350 may collect and store (at 1245) new information to the disk element session data A 802, whereby the disk element session data A 802 and disk element session data B 802 are kept separate in system aggregate B so the data does not intermingle. Upon the servicing of the serviced disk element being completed, the servicing modules 400 then begin to transfer (at 1250) disk element session data A 802 stored in system aggregate B to system aggregate A for storage. The serviced disk element 350 is then brought back online (at 1255) and resumes servicing data on data aggregate A using the disk element session data A 802.

Then method 1200 then ends. The method 1200 may be repeated for each node in the cluster, whereby each disk element in the cluster is serviced in turn. If both the network element 310 and disk element 350 software components of the nodes 200 of a cluster are to be serviced, the above described method 1000 for servicing the network element and the method 1200 for servicing the disk element can be performed on each node. This process may be repeated for each node in the cluster, whereby each node in the cluster is serviced one after the other. By performing servicing on one node in the cluster at a time, the entire cluster system does not need to be taken offline, thus reducing disruption to client data-access.

Some embodiments may be conveniently implemented using a conventional general purpose or a specialized digital computer or microprocessor programmed according to the teachings of the present disclosure, as will be apparent to those skilled in the computer art. Appropriate software coding may readily be prepared by skilled programmers based on the teachings of the present disclosure, as will be apparent to those skilled in the software art. Some embodiments may also be implemented by the preparation of application-specific integrated circuits or by interconnecting an appropriate network of conventional component circuits, as will be readily apparent to those skilled in the art.

Some embodiments include a computer program product which is a storage medium (media) having instructions stored thereon/in which may be used to control, or cause, a computer to perform any of the processes of an embodiment. The storage medium may include without limitation any type of disk including floppy disks, mini disks (MD's), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), some embodiments include software for controlling both the hardware of the general purpose/specialized computer or microprocessor, and for enabling the computer or microprocessor to interact with a human user or other mechanism utilizing the results of an embodiment. Such software may include without limitation device drivers, operating systems, and user applications. Ultimately, such computer readable media further includes software for performing some embodiments, as described above. Included in the programming (software) of the general/specialized computer or microprocessor are software modules for implementing the teachings of some embodiments.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

We claim:

1. A method comprising:
   receiving, by a first node, an access request from a client device for a data container stored on shared storage accessible over a network to the first node and a second node;
   retrieving, by the first node over the network from the second node, stored session data for a prior session where the data container was accessed using a stored user identifier and a stored data container handle;
   comparing the stored user identifier and the stored data container handle to a user identifier and a data container handle of the access request to determine whether the client device accessed the data container through the prior session with the second node based upon the user identifier matching the stored user identifier and the data container handle matching the stored data container handle; and
   validating and performing the access request upon the data container by the first node based upon the client device being associated with the prior session with the second node, otherwise, denying the access request.

2. The method of claim 1, comprising:
   performing maintenance upon the second node.

3. The method of claim 1, comprising:
   obtaining access to the stored session data based upon the second node being unable to process access requests.

4. The method of claim 1, wherein the receiving comprises:
   receiving the access request in place of the second node based upon a determination that the second node has failed.

5. The method of claim 1, comprising:
   performing a network disconnect to disconnect the second node from one or more client devices.

6. The method of claim 1, wherein the data container handle comprises a physical address for the data container.

7. The method of claim 1, wherein the stored data container handle was generated in response to the second node validating that validated client device having the stored user identifier.

8. A non-transitory machine readable medium comprising instructions for performing a method, which when executed by a machine, causes the machine to:
   receive, by a first node, an access request from a client device for a data container stored on shared storage accessible over a network to the first node and a second node;
   retrieve, by the first node over the network from the second node, stored session data for a prior session where the data container was accessed using a stored user identifier and a stored data container handle;
   compare the stored user identifier and the stored data container handle to a user identifier and a data container handle of the access request to determine whether the client device accessed the data container through the prior session with the second node based upon the user identifier matching the stored user identifier and the data container handle matching the stored data container handle; and
   validate and perform the access request upon the data container by the first node based upon the client device being associated with the prior session with the second node, otherwise, deny the access request.

9. The non-transitory machine readable medium of claim 8, wherein the instructions cause the machine to:
   perform an upgrade upon the second node.

10. The non-transitory machine readable medium of claim 8, wherein the instructions cause the machine to:
    obtain access to the stored session data based upon the second node being unable to process access requests.

11. The non-transitory machine readable medium of claim 8, wherein the instructions cause the machine to:
    receive the access request in place of the second node based upon a determination that the second node has failed.

12. The non-transitory machine readable medium of claim 8, wherein the instructions cause the machine to:
    perform a network disconnect to disconnect the second node from one or more client devices.

13. The non-transitory machine readable medium of claim 8, wherein the data container handle comprises a physical address for the data container.

14. The non-transitory machine readable medium of claim 8, wherein the stored data container handle was generated in response to the second node validating that validated client device having the stored user identifier.

15. A computing device comprising:
    a memory instructions for performing a method; and
    a processor coupled to the memory, the processor configured to execute the instructions to cause the processor to:
    receive, by a first node, an access request from a client device for a data container stored on shared storage accessible over a network to the first node and a second node;
    retrieve, by the first node over the network from the second node, stored session data for a prior session where the data container was accessed using a stored user identifier and a stored data container handle;
    compare the stored user identifier and the stored data container handle to a user identifier and a data container handle of the access request to determine whether the client device accessed the data container through the prior session with the second node based upon the user identifier matching the stored user identifier and the data container handle matching the stored data container handle; and
    validate and perform the access request upon the data container by the first node based upon the client device being associated with the prior session with the second node, otherwise, deny the access request.

16. The computing device of claim 15, wherein the instructions cause the processor to:
    perform a re-installation for the second node.

17. The computing device of claim 15, wherein the instructions cause the processor to:
    obtain access to the stored session data based upon the second node being unable to process access requests.

18. The computing device of claim 15, wherein the instructions cause the processor to:

receive the access request in place of the second node based upon a determination that the second node has failed.

19. The computing device of claim 15, wherein the instructions cause the processor to:

perform a network disconnect to disconnect the second node from one or more client devices.

20. The computing device of claim 15, wherein the data container handle comprises a physical address for the data container.

\* \* \* \* \*